United States Patent
Kasuya et al.

(10) Patent No.: US 12,111,054 B2
(45) Date of Patent: Oct. 8, 2024

(54) GAS TURBINE COMBUSTOR STRUCTURE

(71) Applicant: TOSHIBA ENERGY SYSTEMS & SOLUTIONS CORPORATION, Kawasaki (JP)

(72) Inventors: Hiroki Kasuya, Yokohama Kanagawa (JP); Masao Itoh, Yokohama Kanagawa (JP); Yasunori Iwai, Yokohama Kanagawa (JP); Yuichi Morisawa, Yokohama Kanagawa (JP); Takashi Sasaki, Yokohama Kanagawa (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/464,565

(22) Filed: Sep. 11, 2023

(65) Prior Publication Data
US 2023/0417413 A1 Dec. 28, 2023

Related U.S. Application Data

(63) Continuation of application No. PCT/JP2022/017993, filed on Apr. 18, 2022.

(30) Foreign Application Priority Data

Apr. 30, 2021 (JP) .................. 2021-077479

(51) Int. Cl.
F23R 3/12 (2006.01)
F23R 3/46 (2006.01)
(Continued)

(52) U.S. Cl.
CPC .................. *F23R 3/12* (2013.01); *F23R 3/46* (2013.01); *F23R 3/20* (2013.01); *F23R 3/28* (2013.01)

(58) Field of Classification Search
CPC ...... F23R 3/12; F23R 3/46; F23R 3/52; F23R 3/58
See application file for complete search history.

(56) References Cited

U.S. PATENT DOCUMENTS 6,374,594 B1 * 4/2002 Kraft .................. F23R 3/46
60/732
11,892,169 B2 * 2/2024 Itoh .................. F23R 3/02
(Continued)

FOREIGN PATENT DOCUMENTS

| JP | 2014-037825 A | 2/2014 |
|---|---|---|
| JP | 2014-215036 A | 11/2014 |
| JP | 6822868 B2 | 1/2021 |

*Primary Examiner* — William H Rodriguez
(74) *Attorney, Agent, or Firm* — Foley & Lardner LLP

(57) ABSTRACT

A combustor structure of an embodiment includes: a plurality of combustors; a rear liner which guides a combustion gas from the plurality of combustors to a downstream side; and a scroll which guides the combustion gas from the rear liner in an axial direction and a circumferential direction of a turbine rotor. Each of the combustors includes: a combustor liner; a fuel supply part which supplies fuel into the combustor liner; and an oxidant supply part which supplies a swirling flow of an oxidant from the circumference of the fuel supply part into the combustor liner. The plurality of combustors include: the combustor in which a swirling direction of the swirling flow of the oxidant is clockwise; and the combustor in which a swirling direction of the swirling flow of the oxidant is counterclockwise.

8 Claims, 14 Drawing Sheets

(51) Int. Cl.
*F23R 3/20* (2006.01)
*F23R 3/28* (2006.01)

(56) References Cited

U.S. PATENT DOCUMENTS

| | | |
|---|---|---|
| 2003/0172655 A1* | 9/2003 | Verdouw ................. F23D 14/82 60/737 |
| 2005/0241316 A1* | 11/2005 | Nguyen .................... F23R 3/10 60/722 |
| 2010/0077719 A1* | 4/2010 | Wilson ...................... F23R 3/46 415/191 |
| 2014/0318135 A1 | 10/2014 | Knapp et al. |
| 2015/0121898 A1 | 5/2015 | Tashima et al. |
| 2020/0056788 A1 | 2/2020 | Isono et al. |
| 2020/0271319 A1* | 8/2020 | Chen ......................... F02C 7/22 |
| 2020/0271320 A1* | 8/2020 | Chen ......................... F23R 3/50 |
| 2022/0003414 A1* | 1/2022 | Chen ......................... F23R 3/12 |
| 2022/0120442 A1* | 4/2022 | Itoh ........................... F02C 1/08 |

* cited by examiner

GAS TURBINE COMBUSTOR STRUCTURE

CROSS-REFERENCE TO RELATED APPLICATIONS

This application is a continuation of International Patent Application No. PCT/JP2022/017993, filed on Apr. 18, 2022, which is based upon and claims the benefit of priority from Japanese Patent Application No. 2021-077479, filed on Apr. 30, 2021; the entire contents of which are incorporated herein by reference.

FIELD

Embodiments of the present invention relate to a gas turbine combustor structure.

BACKGROUND

In recent years, in power generation plant including a gas turbine combustor, increasing efficiency is in progress in response to demands for reduction of carbon dioxide, resource conservation, and the like. Under such circumstances, a supercritical $CO_2$ gas turbine in which a part of a combustion gas discharged from a turbine is pressurized to a supercritical pressure to be circulated through the combustor is under consideration.

The supercritical $CO_2$ gas turbine is in operating conditions under a superhigh-pressure environment, and thus the adoption of a double casing structure including an inner casing and an outer casing is essential. Hence, as such a supercritical $CO_2$ gas turbine, a vertical silo-type combustor in which sealing performance is easy to maintain also in the double casing structure is used.

In the vertical silo-type combustor, the combustor is inserted from a vertically upper side or a vertically lower side of the outer casing. That is, the vertical silo-type combustor is disposed to penetrate the outer casing and the inner casing at an angle of 90 degrees to an axial direction of a turbine rotor.

Further, in the combustor of the supercritical $CO_2$ gas turbine, combustor inlet conditions are of superhigh pressure and high temperatures. Under such conditions, when a premixed combustion system is adopted to the combustor of the supercritical $CO_2$ gas turbine, a premixed gas before being ejected to a combustion area is sometimes ignited automatically in a premixed gas supply pipe. Hence, a diffusion combustion system is adopted to the combustor of the supercritical $CO_2$ gas turbine.

FIG. 13 is a view illustrating a longitudinal section of a vertical silo-type combustor structure 300 in a supercritical $CO_2$ gas turbine. FIG. 14 is a view illustrating an X-X cross section in FIG. 13.

The combustor structure 300 includes a combustor 310, a rear liner 320, and a scroll 330. Further, the combustor structure 300 includes a plurality of the combustors 310.

The combustor structure 300 is disposed to penetrate an outer casing 350 and an inner casing 355 from a direction perpendicular to an axial direction of a turbine rotor 340.

A combustor casing 360 surrounding the combustor structure 300 is provided outside the outer casing 350. The other end of the combustor casing 360 is closed by a head plate 361. A sleeve 351 is provided between the outer casing 350 and the inner casing 355 which make the combustor structure 300 penetrate.

The combustor 310 includes a combustor liner 311, a fuel supply part 312, and an oxidant supply part 313.

The combustor liner 311 is constituted by a cylindrical member in which fuel and an oxidant are combusted. A sidewall of the combustor liner 311 is provided with a plurality of introduction holes 311a for guiding the supercritical $CO_2$ flowing outside the combustor liner 311 to the interior thereof.

The fuel supply part 312 supplies the fuel into the combustor liner 311.

The oxidant supply part 313 supplies the oxidant into the combustor liner 311. The oxidant supply part 313 is provided in an annular shape around the fuel supply part 312. At an outlet 313a, in an annular shape, of the oxidant supply part 313, to stabilize flames and promote mixing of the fuel and the oxidant, a swirler 314 which forms a swirling flow of the oxidant is provided.

In the combustor structure 300, swirling directions of the swirling flows formed by the swirlers 314 of the combustors 310 are set in the same direction.

A downstream end of the combustor liner 311 of each of the combustors 310 is fitted in a through opening 322 in an upstream end wall 321 provided at an upstream end of the rear liner 320. Further, each of the combustor liners 311 is communicated through the through opening 322 into the rear liner 320.

The rear liner 320 is a flow path which gathers the combustion gas discharged from the plurality of combustors 310 and guides it to the scroll 330 while straightening its flow.

As illustrated in FIG. 13, the rear liner 320 is constituted by a cylindrical member. A sidewall of the rear liner 320 is provided with a plurality of introduction holes 323 for guiding the supercritical $CO_2$ flowing outside the rear liner 320 to the interior thereof.

The scroll 330 is a flow path which guides the combustion gas discharged from the rear liner 320 in the axial direction of the turbine rotor 340 and guides the combustion gas in a circumferential direction of the turbine rotor 340. The scroll 330 includes a bent flow path portion 331 which guides the combustion gas discharged from the rear liner 320 in the axial direction of the turbine rotor 340 and an annular flow path portion 332 which guides the combustion gas guided in the axial direction of the turbine rotor 340 in the circumferential direction of the turbine rotor 340, as illustrated in FIG. 13.

An outlet 333 of the annular flow path portion 332 (scroll 330) is opposed to a first-stage stator blade 345.

In the above-described combustor structure 300, the fuel supplied to the fuel supply part 312 and the oxidant supplied to the oxidant supply part 313 form a diffusion flame F in the combustor liner 311 to cause combustion. Changing a flow of the oxidant into the swirling flow with the swirler 314 also changes a flow of the combustion gas in the combustor liner 311 into a swirling flow.

In FIG. 14, swirling directions of the swirling flows of the combustion gas in the combustor liners 311 of the combustors 310 are indicated by solid arrows. As illustrated in FIG. 14, the swirling directions of the combustion gas in the combustor liners 311 are the same. Note that the supercritical $CO_2$ which is a cooling medium is introduced from the introduction holes 311a of the combustor liner 311 into the combustor liner 311.

The combustion gas (containing the supercritical $CO_2$) discharged from the combustor liners 311 forms one swirling flow in the rear liner 320, and flows in the rear liner 320. In FIG. 14, a swirling direction of the swirling flow of the combustion gas in the rear liner 320 is indicated by a dotted arrow.

The swirling direction of the swirling flow in the rear liner 320 is the same as the swirling directions of the combustion gas in the combustor liners 311. Note that the supercritical $CO_2$ which is the cooling medium is introduced from the introduction holes 323 of the rear liner 320 into the rear liner 320.

The swirling flow of the combustion gas (containing the supercritical $CO_2$) in the rear liner 320 flows into the scroll 330. A flow of the combustion gas flowing into the bent flow path portion 331 of the scroll 330 is biased to about 90 degrees in the axial direction of the turbine rotor 340. Then, the combustion gas whose flow is biased flows into the annular flow path portion 332. The combustion gas flowing into the annular flow path portion 332 expands in the circumferential direction of the turbine rotor 340.

Then, the combustion gas is ejected from the outlet 333 of the scroll 330 toward the first-stage stator blade 345.

As described above, in the combustor structure 300, the swirling flows of the combustion gas discharged from the combustors 310 form one swirling flow in the rear liner 320. Then, this swirling flow flows into the scroll 330.

This causes the combustion gas to flow non-uniformly in the circumferential direction due to the effect of the swirling flow when the combustion gas flows through the annular flow path portion 332 of the scroll 330. Concretely, in the annular flow path portion 332, when the flow of the combustion gas expands in a clockwise direction and a counterclockwise direction around the turbine rotor 340 from a vertically upper side, a flow rate in one of the directions increases.

Thus, at the outlet 333 of the annular flow path portion 332 (scroll 330), the combustion gas is difficult to eject to the first-stage stator blade 345 at a uniform velocity over the circumferential direction.

DETAILED DESCRIPTION

Hereinafter, embodiments of the present invention will be described in reference to the drawings.

In one embodiment, a gas turbine combustor structure of an embodiment is disposed to penetrate a casing of a gas turbine from a direction perpendicular to an axial direction of a turbine rotor of the gas turbine. The gas turbine combustor structure includes: a plurality of combustors; a rear liner which is constituted by a cylinder body provided in a direction perpendicular to the axial direction of the turbine rotor on a downstream side of the plurality of combustors, and gathers a combustion gas discharged from the plurality of combustors and guides the combustion gas to a downstream side; and a scroll which is connected to a downstream end of the rear liner, and guides the combustion gas discharged from the rear liner in the axial direction of the turbine rotor and guides the combustion gas in a circumferential direction of the turbine rotor.

Each combustor of the plurality of combustors includes: a combustor liner in a cylindrical shape, which combusts fuel and an oxidant; a fuel supply part which is provided at an upstream end of the combustor liner, and supplies the fuel into the combustor liner; and an oxidant supply part which is provided in an annular shape around the fuel supply part, and supplies a swirling flow of the oxidant into the combustor liner. Further, the plurality of combustors include: the combustor in which a swirling direction of the swirling flow of the oxidant is clockwise when seen from a downstream side of the oxidant supply part; and the combustor in which a swirling direction of the swirling flow of the oxidant is counterclockwise when seen from the downstream side of the oxidant supply part.

First Embodiment

Figure 1:
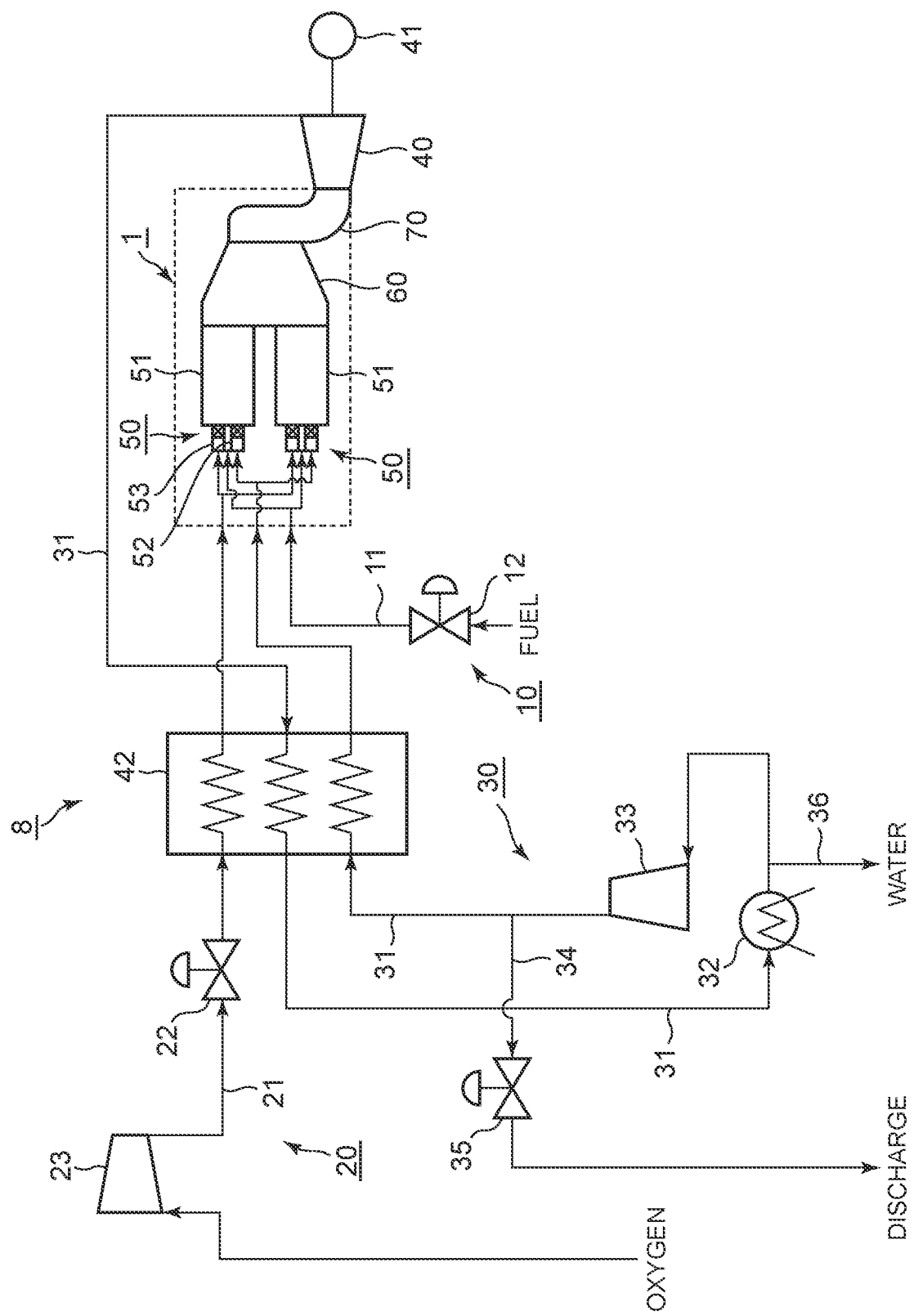
FIG. 1 is a system diagram of a gas turbine facility including a combustor structure of a first embodiment.

FIG. 1 is a system diagram of a gas turbine facility 8 including a combustor structure 1 of a first embodiment. As illustrated in FIG. 1, the gas turbine facility 8 includes the combustor structure 1, a fuel supply system 10, an oxygen supply system 20, a carbon dioxide circulation system 30, a turbine 40, a generator 41, and a heat exchanger 42. Note that the combustor structure 1 functions as a gas turbine combustor structure.

The fuel supply system 10 supplies fuel to the combustor structure 1. The fuel supply system 10 includes a pipe 11. The pipe 11 is provided between a fuel supply source (not illustrated) and the combustor structure 1. Further, the pipe 11 includes a flow rate regulating valve 12 which regulates a flow rate of the fuel.

Here, as the fuel, for example, hydrocarbon such as methane or natural gas is used. Further, as the fuel, for example, a coal gasification gas fuel containing carbon monoxide, hydrogen, and the like can also be used.

The oxygen supply system 20 supplies oxygen to the combustor structure 1. The oxygen supply system 20 includes a pipe 21. The pipe 21 is provided between an air separating apparatus (not illustrated) which separates oxygen from the air and the combustor structure 1.

The pipe 21 includes a flow rate regulating valve 22 which regulates a flow rate of the oxygen. Further, the pipe 21 includes a compressor 23 which pressurizes the oxygen. The flow rate regulating valve 22 is provided between the compressor 23 and the heat exchanger 42. Further, the pipe 21 is provided to extend through the heat exchanger 42 to the combustor structure 1. Note that the flow rate regulating valve 22 is provided on an upstream side from the heat exchanger 42, which prevents high-temperature oxygen from flowing through the flow rate regulating valve 22.

The oxygen separated from the air by the air separating apparatus (not illustrated) flows through the pipe 21. The oxygen flowing through the pipe 21 is heated by passing through the heat exchanger 42 to be supplied to the combustor structure 1.

The carbon dioxide circulation system 30 circulates a part of a combustion gas discharged from the turbine 40 through the combustor structure 1. The carbon dioxide circulation system 30 includes a pipe 31. The pipe 31 is provided between an outlet of the turbine 40 and the combustor structure 1.

The pipe 31 includes a condenser 32 which removes water vapor contained in the combustion gas. Note that the water vapor in the combustion gas passes through the condenser 32, thereby condensing into water. The water is discharged through a pipe 36 to the outside, for example.

Further, the pipe 31 includes a compressor 33 which pressurizes the combustion gas from which the water vapor has been removed in the condenser 32 to a critical pressure or more. The condenser 32 and compressor 33 are provided in the pipe 31 in an area where the combustion gas cooled by the heat exchanger 42 flows.

Here, in the gas turbine facility 8, excess oxygen and fuel preferably do not remain in the combustion gas discharged from the combustor structure 1 (combustor 50). Thus, the flow rates of the fuel and the oxygen are regulated so as to have a stoichiometric mixture ratio (equivalence ratio 1).

Note that the equivalence ratio which is mentioned here is an equivalence ratio calculated on the basis of the fuel flow rate and the oxygen flow rate. In other words, it is an equivalence ratio when it is assumed that the fuel and the oxygen are uniformly mixed (overall equivalence ratio).

Therefore, most of components of the combustion gas from which the water vapor has been removed in the condenser 32 (dry combustion gas) are carbon dioxide. Thus, the combustion gas from which the water vapor has been removed is simply referred to as carbon dioxide. As described above, a medium circulated to the combustor structure 1 is carbon dioxide.

Note that, for example, a slight amount of carbon monoxide of 0.2% or less is sometimes mixed in the combustion gas from which the water vapor has been removed, and also in this case, the combustion gas from which the water vapor has been removed is simply referred to as carbon dioxide. Further, the carbon dioxide pressurized to the critical pressure or more by the compressor 33 becomes a supercritical fluid.

The pipe 31 is disposed to pass through the heat exchanger 42 twice. That is, the pipe 31 passes through the heat exchanger 42 once between the turbine 40 and the condenser 32. Then, the pipe 31 passes through the heat exchanger 42 again between the compressor 33 and the combustor structure 1.

Here, the combustion gas discharged from the turbine 40 is cooled by passing through the heat exchanger 42. At this time, the oxygen flowing through the pipe 21 and the carbon dioxide passing through the pipe 31 and circulating to the combustor structure 1, which are previously described, are heated by heat release from the combustion gas.

Further, the pipe 31 branches between the compressor 33 and the heat exchanger 42. The pipe 34 branched from the pipe 31 includes a flow rate regulating valve 35 which regulates a flow rate of carbon dioxide to be discharged to the outside. Note that the carbon dioxide discharged to the outside can be utilized for EOR (Enhanced Oil Recovery) employed at an oil drilling field, for example.

As illustrated in FIG. 1, one end side (combustor structure 1 side) of the pipe 11 which supplies the fuel is branched into two or more. Then, the branched pipes 11 are connected to the combustors 50 of the combustor structure 1.

Figure 2:
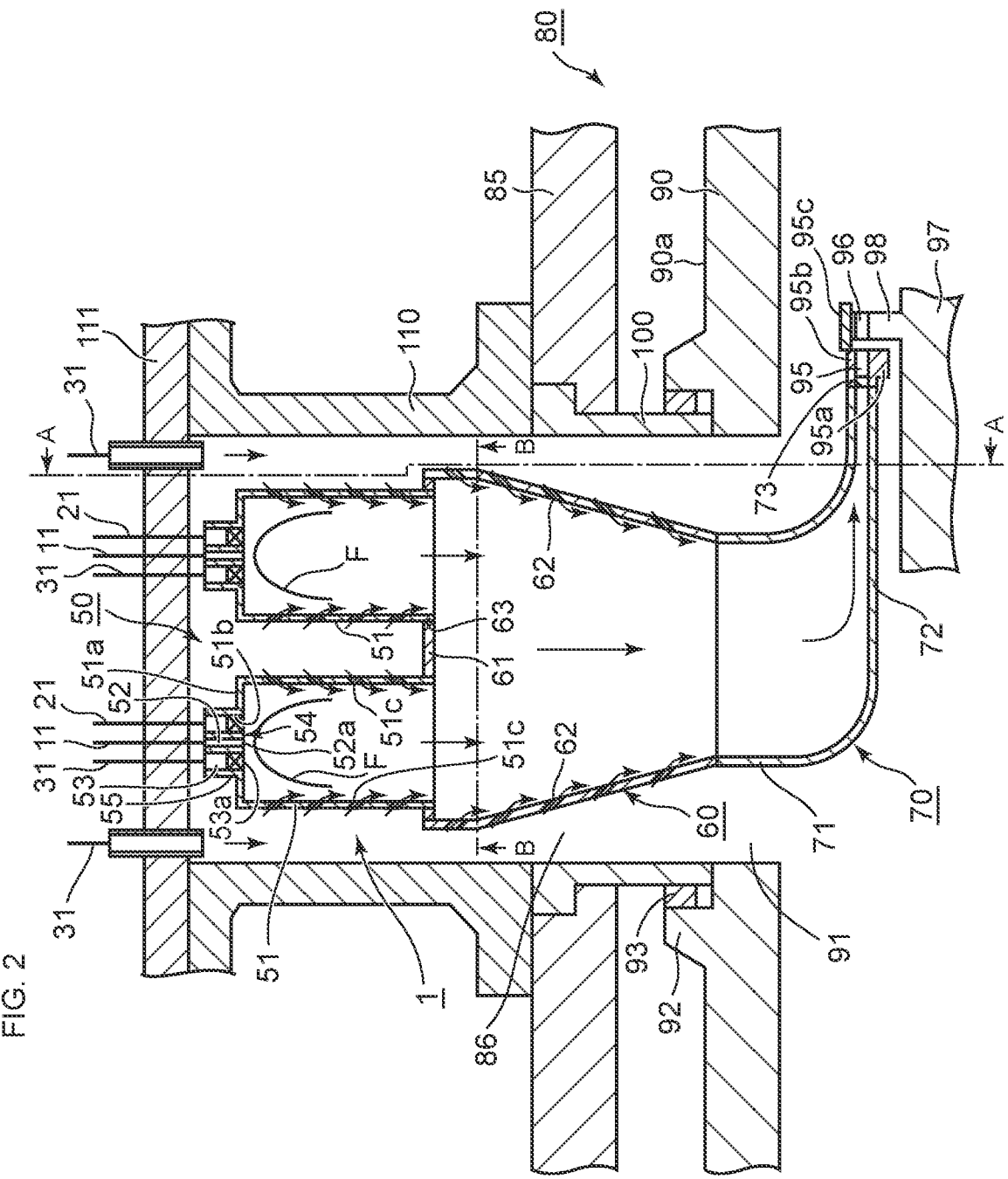
FIG. 2 is a view illustrating a longitudinal section of the combustor structure of the first embodiment.

Further, one end side (combustor structure 1 side) of the pipe 31 which circulates the carbon dioxide through the combustor structure 1 is branched into two or more, for example. Supercritical $CO_2$ supplied from a part of the branched pipes 31 is used for forming an oxidant which is a mixed gas of the supercritical $CO_2$ and oxygen. The rest of the branched pipes 31 are used for introducing the supercritical $CO_2$ around the combustor structure 1 as a cooling medium as illustrated in FIG. 2 described later.

One end side (combustor structure 1 side) of the pipe 21 which supplies the oxygen to the combustor structure 1 is branched into two or more.

Then, one of the branched pipes 31 and one of the branched pipes 21 are connected to an oxidant supply part 53 of each of the combustors 50. Then, the oxygen and the supercritical $CO_2$ which are introduced to the oxidant supply part 53 are mixed to form the mixed gas. This mixed gas is ejected into a combustor liner 51 as an oxidant.

Note that a method for forming the mixed gas is not limited to this method. For example, a mixing chamber formed of a casing member having a space in the interior thereof may be included. In this case, a part of the branched pipes 31 and a part of the branched pipes 21 are connected to the mixing chamber. Then, the mixed gas formed in the mixing chamber is supplied through a pipe to the oxidant supply part 53 of each of the combustors 50.

Further, the pipe 31 may be branched between the heat exchanger 42 and the combustor structure 1 to couple the branched pipe to the pipe 21 through which the oxygen flows. This coupling portion is provided in the pipe 21 between the heat exchanger 42 and the combustor structure 1, for example.

Further, the pipe 31 may be branched between the compressor 33 and the heat exchanger 42 to couple the branched pipe to the pipe 21 through which the oxygen flows. This coupling portion is provided in the pipe 21 between the flow rate regulating valve 22 and the heat exchanger 42, for example.

Also in the case of providing the coupling portion either between the heat exchanger 42 and the combustor structure 1 or between the flow rate regulating valve 22 and the heat exchanger 42, the pipe branched from the pipe 31 includes a flow rate regulating valve which regulates a flow rate of the supercritical $CO_2$ to be mixed with the oxygen.

Note that when the pipe 31 branched between the compressor 33 and the heat exchanger 42 is coupled to the pipe 21 between the flow rate regulating valve 22 and the heat exchanger 42, the mixed gas of the oxygen and the supercritical $CO_2$ is heated by the heat exchanger 42, and supplied to the combustor structure 1. Hence, oxidation of the pipe 21, or the like can be inhibited as compared with a case where high-temperature pure oxygen flows through the pipe 21.

The turbine 40 is rotationally moved by the combustion gas discharged from the combustor structure 1. For example, a generator 41 is connected to the turbine 40.

Next, a configuration of the combustor structure 1 will be described.

Figure 3:
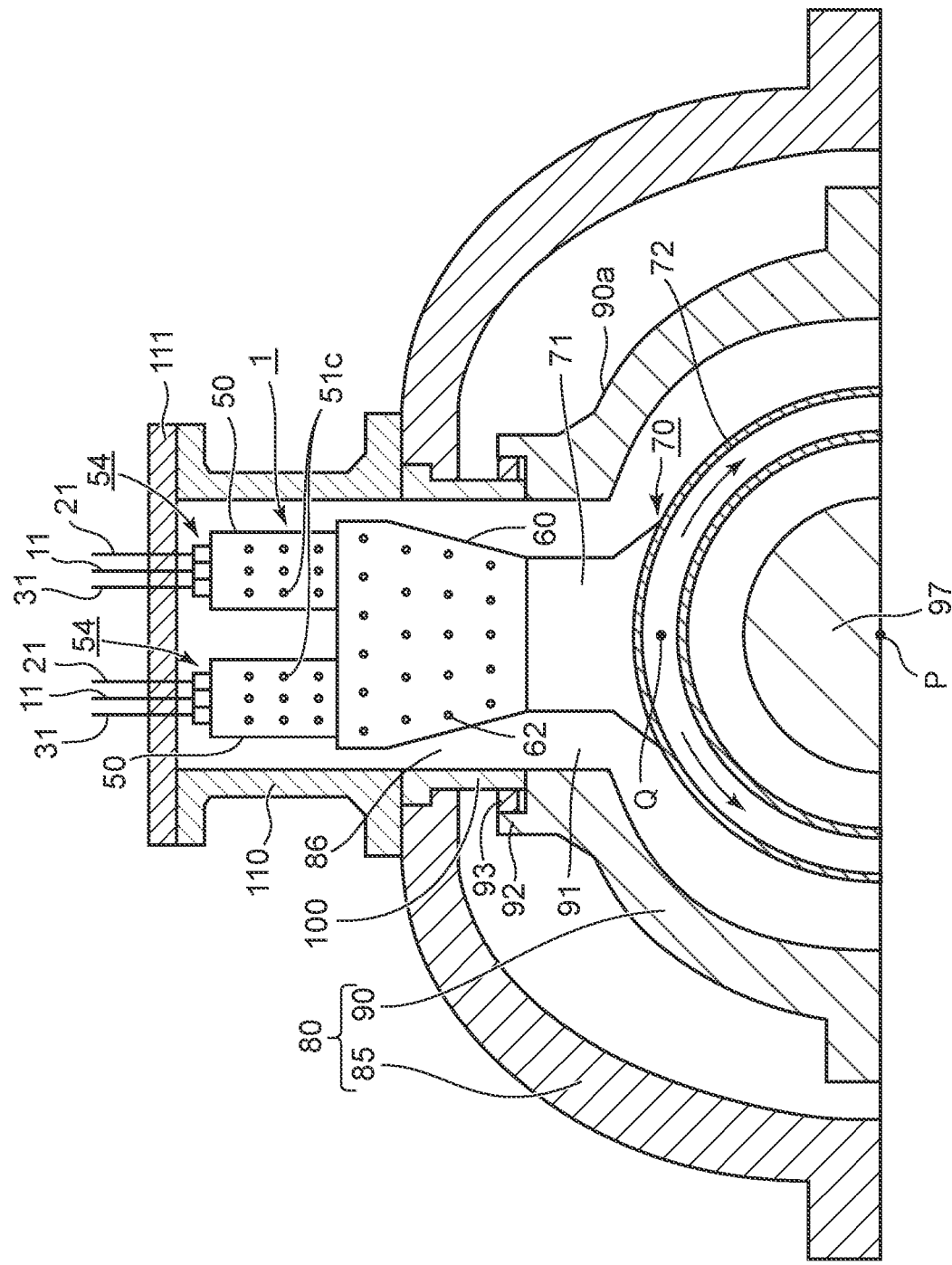
FIG. 3 is a view illustrating an A-A cross section in FIG. 2.
Figure 4:
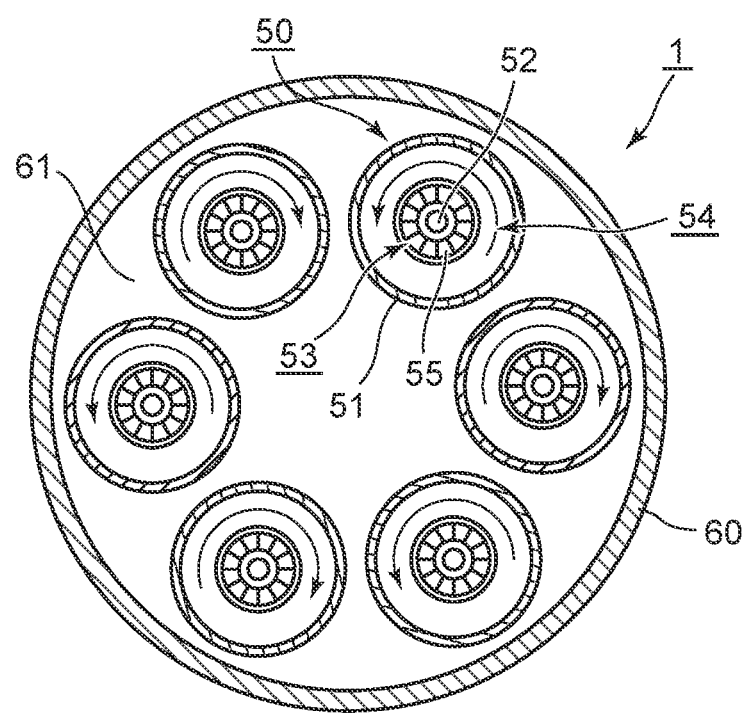
FIG. 4 is a view illustrating a B-B cross section in FIG. 2.

FIG. 2 is a view illustrating a longitudinal section of the combustor structure 1 of the first embodiment. FIG. 3 is a view illustrating an A-A cross section in FIG. 2. FIG. 4 is a view illustrating a B-B cross section in FIG. 2. Note that the combustor structure 1 illustrated in FIG. 2-FIG. 4 is illustrated by the sectional views in a state of being installed in the gas turbine. Hence, FIG. 2-FIG. 4 also illustrate a configuration of a casing of the gas turbine, or the like, for example. Further, FIG. 2 and FIG. 3 illustrate a configuration on an upper half side. Here, one example of providing the combustor structure 1 on the upper half side is indicated.

Here, the combustor structure 1 is installed in a supercritical $CO_2$ gas turbine which uses the supercritical $CO_2$ for a working fluid. Since the combustor structure 1 and the turbine 40 are operated under a condition of a superhigh pressure, a casing 80 is constituted by a double casing structure including an inner casing 90 and an outer casing as illustrated in FIG. 2 and FIG. 3. The outer casing 85 is provided on an outer peripheral side of the inner casing 90 with a predetermined gap therebetween.

In the inner casing 90, stator blades 95 and rotor blades 96 are arranged alternately in an axial direction of a turbine rotor 97. The stator blade 95 is arranged between an inner ring sidewall 95a and an outer ring sidewall 95b. The rotor blade 96 is provided on a rotor wheel 98 of the turbine rotor 97. Note that an outer periphery of the rotor blade 96 is provided with an outer wall 95c apart from a tip of the rotor blade 96. The outer wall 95c may be formed by extending the outer ring sidewall 95b in the axial direction of the turbine rotor 97, for example.

The combustor structure 1 includes the combustor 50, a rear liner 60, and a scroll 70. Further, the combustor structure 1 includes a plurality of the combustors 50.

Here, the number of the arranged combustors 50 is determined based on a heat quantity allowed to be supplied from the one combustor 50 and a heat quantity required for the supercritical $CO_2$ gas turbine, for example.

The combustor structure 1 is disposed to penetrate the outer casing 85 and the inner casing 90 from a direction perpendicular to the axial direction of the turbine rotor 97 as illustrated in FIG. 2 and FIG. 3. The combustor structure 1 is, what is called, a vertical silo-type combustor structure. Here, one example of making the combustor structure 1 penetrate from a vertically upper side is indicated.

A combustor casing 110 surrounding the combustor structure 1 is provided outside the outer casing 85. The combustor casing 110 is constituted by a cylindrical casing whose both ends are open.

One end of the combustor casing 110 is fixed on the outer casing 85. The other end of the combustor casing 110 is closed by a head plate 111. Note that, for example, in the head plate 111, through holes (not illustrated) for pulling the pipes 21, the pipes 31, and the pipes 11 into the combustor casing 110 are provided.

In the outer casing 85 and the inner casing 90, through openings 86, 91 for making the combustor structure 1 penetrate are formed. A sleeve 100 is provided between the outer casing 85 and the inner casing 90 which make the combustor structure 1 penetrate.

The sleeve 100 prevents the supercritical $CO_2$ as the cooling medium flowing around the combustor structure 1 from flowing out in a space between the outer casing 85 and the inner casing 90. The sleeve 100 is constituted by a cylindrical member, for example.

Further, on the outer peripheral surface 90a of the inner casing 90 abutting on the sleeve 100, a ridge portion 92 in a circular shape is formed over the periphery of the sleeve 100 apart from the sleeve 100. The ridge portion 92 projects to the outer casing 85 side. Between the sleeve 100 and the ridge portion 92, a seal ring 93 in a circular shape is fitted.

The combustor 50 includes the combustor liner 51, a fuel supply part 52, and the oxidant supply part 53.

The combustor liner 51 is constituted by a cylindrical member in which the fuel and the oxidant are combusted. One end (upstream end) of the combustor liner 51 is blocked by an upstream end wall 51a, and the other end (downstream end) of the combustor liner 51 is opened. The combustor liner 51 is constituted by a linearly extending cylinder body or the like, for example. Note that the combustor liner 51 may be constituted by a partially curved cylinder body or the like, for example.

The upstream end wall 51a has an opening 51b for providing the fuel supply part 52 and the oxidant supply part 53.

Incidentally, the upstream means an upstream in a direction in which the combustion gas flows, and the downstream means a downstream in the direction in which the combustion gas flows.

As illustrated in FIG. 2 and FIG. 3, the combustor liner 51 is disposed so that a center axis of the combustor liner 51 is perpendicular to the axial direction of the turbine rotor 97, for example.

Further, a sidewall of the combustor liner 51 is provided with a plurality of introduction holes 51c for guiding the supercritical $CO_2$ flowing outside the combustor liner 51 to the interior thereof. This supercritical $CO_2$ flowing outside the combustor liner 51 has a function of cooling the combustor liner 51.

Note that the introduction hole 51c is constituted by a slit, a hole, or the like, for example. The combustor liner 51 is cooled by film cooling or the like, for example. When the film cooling is applied, the supercritical $CO_2$ which is the cooling medium introduced from the introduction holes 51c forms a heat insulating film of gas between an inner wall surface of the combustor liner 51 and the combustion gas. This inhibits direct contact of the inner wall surface of the combustor liner 51 with the combustion gas.

The fuel supply part 52 supplies the fuel into the combustor liner 51. The fuel supply part 52 is provided in the upstream end wall 51a of the combustor liner 51. The fuel supply part 52 is provided at the center of the upstream end wall 51a, as illustrated in FIG. 2, for example.

The fuel supply part 52 is constituted by a cylindrical tube or the like, for example. The fuel supply part 52 is coupled to the pipe 11 which supplies the fuel. An outlet 52a of the fuel supply part 52 provides a function as a fuel nozzle, for example. The outlet 52a is constituted by a fuel injection hole with a single-hole, a fuel ejection hole with a multi-hole, or the like, for example. The fuel is ejected from the outlet 52a of the fuel supply part 52 into the combustor liner 51.

The oxidant supply part 53 supplies the oxidant into the combustor liner 51. The oxidant supply part 53 is provided in the upstream end wall 51a of the combustor liner 51. The oxidant supply part 53 is provided concentrically with the fuel supply part 52 and in an annular shape around the fuel supply part 52, as illustrated in FIG. 2, for example. The oxidant supply part 53 in the annular shape is formed by providing a cylindrical tube on the outer periphery of the fuel supply part 52, for example.

Thus, for example, the fuel supply part 52 and the oxidant supply part 53 are formed in a double-tube structure. The fuel is ejected from the central fuel ejection hole and the oxidant is ejected from the annular flow path formed around the central fuel ejection hole. That is, a diffusion combustion system is adopted to the combustor 50.

At an outlet 53a, in an annular shape, of the oxidant supply part 53, for example, a swirler 55 which forms a swirling flow of the oxidant is provided. The swirler 55 is provided with a plurality of vanes in a circumferential direction in an annular passage. The vanes are arranged to be inclined at a predetermined angle to an axial direction of the annular passage.

The oxidant passes through the swirler 55, and thereby the swirling flow having a circumferential velocity component is ejected into the combustor liner 51. Thus, changing a flow of the oxidant into the swirling flow promotes mixing of the fuel and the oxidant to form stable flames in the combustor liner 51.

Here, as illustrated in FIG. 4, the plurality of combustors 50 are arranged at regular intervals on a predetermined circumference, for example. Note that FIG. 4 is a sectional view when the combustors 50 are seen from a downstream side of the combustor liners 51.

Note that the predetermined circumference is a circumference centered on the center axis of the combustor casing 110 or a circumference centered at the center of an opening (circular opening) at an upstream end of the rear liner 60, for example.

Here, the plurality of combustors 50 include the combustor 50 in which a swirling direction of the swirling flow of the oxidant supplied from the oxidant supply part 53 is clockwise and the combustor 50 in which a swirling direction of the swirling flow of the oxidant supplied from the oxidant supply part 53 is counterclockwise when seen from a downstream side of the oxidant supply parts 53.

Here, in the following, the combustor 50 in which the swirling direction of the swirling flow of the oxidant is clockwise is referred to as an oxidant-clockwise combustor and the combustor 50 in which the swirling direction of the swirling flow of the oxidant is counterclockwise is referred to as an oxidant-counterclockwise combustor 50 when seen from the downstream side of the oxidant supply parts 53.

For example, as illustrated in FIG. 4, the plurality of combustors 50 are constituted by even numbers of the combustors 50. Further, the arrangement configuration illustrated in FIG. 4 is configured such that the swirling directions of the swirling flows of the oxidant in the combustors 50 adjacent in a circumferential direction are opposite directions to each other. That is, the oxidant-clockwise combustors 50 and the oxidant-counterclockwise combustors 50 are arranged alternately in the circumferential direction.

For example, the configuration in which the six combustors 50 are arranged, illustrated in FIG. 4, includes the three oxidant-clockwise combustors 50 and the three oxidant-counterclockwise combustors 50.

Here, during the combustion, a flow of the combustion gas in the combustor liner 51 depends on the swirling direction of the oxidant. That is, the flow of the combustion gas in the combustor liner 51 is a swirling flow in the same swirling direction as the swirling direction of the swirling flow of the oxidant.

Here, in the rear liner 60, to avoid being affected by the swirling flows in the combustors 50, it is preferable to include even numbers of the combustors 50, and, constitute half of them with the oxidant-clockwise combustors 50 and constitute the remaining half of them with the oxidant-counterclockwise combustors 50. In this case, a specification such as a size or an outlet angle of each of the swirlers 55 provided in the oxidant supply parts 53 of the combustors 50 is preferably set to be equal between the swirlers 55.

Note that in the plurality of combustors 50, the respective numbers of installations of the oxidant-clockwise combustor 50 and the oxidant-counterclockwise combustor 50 may be optionally set.

In this case, at least one each of the oxidant-clockwise combustor 50 and the oxidant-counterclockwise combustor 50 is included. Thus, by including the two of the oxidant-clockwise combustor 50 and the oxidant-counterclockwise combustor 50, the effect of attenuating the swirling flows of the combustion gas discharged from the respective combustors 50 can be obtained.

For example, when the number of installations of the oxidant-clockwise combustor 50 is small, a ratio of the circumferential velocity component to an axial velocity component may be increased in the swirling flow of the oxidant in the oxidant-clockwise combustor 50. The swirlers 55 are preferably designed so that in a flow field of the combustion gas in the rear liner 60, a clockwise swirling flow and a counterclockwise swirling flow interfere with each other to cancel each other of their circumferential velocity components out.

Further, here, FIG. 4 illustrates one example in which the oxidant-clockwise combustors 50 and the oxidant-counterclockwise combustors 50 are arranged alternately in the circumferential direction, and this arrangement configuration is not restrictive. For example, in a case of including even numbers of the combustors 50, and, constituting half of them with the oxidant-clockwise combustors 50 and constituting the remaining half of them with the oxidant-counterclockwise combustors 50, the oxidant-clockwise combustors and the oxidant-counterclockwise combustors 50 may be individually arranged continuously in the circumferential direction.

Further, FIG. 4 illustrates one example in which the plurality of combustors 50 are arranged at regular intervals on the predetermined circumference, and this arrangement configuration is not restrictive. The plurality of combustors 50 may be formed in a plurality of rows. For example, when the six combustors 50 are arranged, the three combustors 50 may be arranged linearly to arrange them in two rows.

Here, the one above-described combustor 50 includes the one combustor liner 51 and one fuel-oxidant supply mechanism 54 provided at the upstream end of the one combustor liner 51. Further, as illustrated in FIG. 2, one diffusion flame F is formed on a downstream side of the one fuel-oxidant supply mechanism 54.

Note that the one fuel-oxidant supply mechanism 54 may include a plurality of the fuel supply parts 52 and a plurality of the oxidant supply parts 53. In this case, swirling directions of swirling flows supplied from the oxidant supply parts 53 are set in the same direction.

A downstream end of the combustor liner 51 of each of the combustors 50 is fitted in a through opening 63 in an upstream end wall 61 fitted at the upstream end of the rear liner 60 as illustrated in FIG. 2. Further, each of the combustor liners 51 is communicated through the through opening 63 into the rear liner 60.

Here, as illustrated in FIG. 1 and FIG. 2, the fuel supply parts 52 of the combustors 50 are each coupled to the branched pipe 11. The oxidant supply parts 53 of the combustors 50 are each coupled to the branched pipe 21 and pipe 31, for example. The oxygen and the supercritical $CO_2$ introduced in an upstream portion of the oxidant supply part 53 are mixed while flowing in the oxidant supply part 53 to become the mixed gas made of the oxygen and the supercritical $CO_2$ at the outlet 53a of the oxidant supply part 53, for example.

The rear liner 60 is provided on a downstream side of the plurality of combustors as illustrated in FIG. 2. The rear liner 60 is a flow path which gathers the combustion gas discharged from the plurality of combustors 50, and guides it to the scroll 70 while straightening its flow.

For example, as illustrated in FIG. 2 and FIG. 3, the rear liner 60 is constituted by a cylindrical member provided to extend in a direction perpendicular to the axial direction of the turbine rotor 97. Further, the rear liner 60 is constituted by having a flow-path portion whose flow path cross-sectional area gradually decreases toward the downstream side, for example. Note that a shape of the rear liner 60 is not limited to this.

One end (upstream end) of the rear liner 60 is sealed by the upstream end wall 61 in a flat-plate shape, and the other end (downstream end) is opened. The upstream end wall 61 has a plurality of the through openings 63 communicated with the downstream ends of the combustor liners 51 as previously described. The through openings 63 are formed to be aligned with positions of the downstream ends of the combustor liners 51. The other end (downstream end) of the rear liner 60 is connected to an upstream end of the scroll 70.

A sidewall of the rear liner 60 is provided with a plurality of introduction holes 62 for guiding the supercritical $CO_2$ flowing outside the rear liner 60 to the interior thereof. This supercritical $CO_2$ flowing outside the rear liner 60 has a function of cooling the rear liner 60.

Note that a configuration of the introduction hole 62 is the same as the previously-described configuration of the introduction hole 51c. Further, an effect by including the introduction holes 62 is the same as the previously-described effect by including the introduction holes 51c.

The scroll 70 is a flow path which guides the combustion gas discharged from the rear liner 60 in the axial direction of the turbine rotor 97 and guides it in a circumferential direction of the turbine rotor 97.

The scroll 70 includes a bent flow path portion 71 which guides the combustion gas discharged from the rear liner 60 in the axial direction of the turbine rotor 97 and an annular flow path portion 72 which guides the combustion gas guided in the axial direction of the turbine rotor 97 in the circumferential direction of the turbine rotor 97 as illustrated in FIG. 2 and FIG. 3.

An upstream end of the bent flow path portion 71 is connected to the downstream end of the rear liner 60. The bent flow path portion 71 is constituted by a bent pipe bent into about 90 degrees in the axial direction of the turbine rotor 97. Note that an outlet side of the bent flow path portion 71 has a configuration to extend in the circumferential direction of the turbine rotor 97 while being bent. Then, the bent flow path portion 71 biases a flow of the combustion gas discharged from the rear liner 60 to about 90 degrees. The flow of the combustion gas whose flow is biased flows in the axial direction of the turbine rotor 97.

The annular flow path portion 72 is constituted by an annular pipe provided to cover the periphery of the turbine rotor 97. Note that the annular flow path portion 72 is formed by combining divided structures formed of a semi-annular-shaped upper half portion and a semi-annular-shaped lower half portion, for example.

The annular flow path portion 72 expands a flow of the combustion gas discharged from the bent flow path portion 71 in the circumferential direction of the turbine rotor 97. In the annular flow path portion 72, the combustion gas having a component of velocity in the axial direction of the turbine rotor 97 expands uniformly in the circumferential direction of the turbine rotor 97.

An outlet 73 of the annular flow path portion 72 (scroll 70) is opposed to a first-stage stator blade 95. Then, the combustion gas flowing in the annular flow path portion 72 is ejected from the outlet 73 toward the first-stage stator blade 95. Note that an outlet end of the annular flow path portion 72 is in contact with upstream ends of the inner ring sidewall 95a and the outer ring sidewall 95b. This causes the combustion gas ejected from the outlet 73 to be guided to the first-stage stator blade 95.

Next, an action in the gas turbine facility 8 and an action in the combustor structure 1 will be described.

First, the action in the gas turbine facility 8 will be described in reference to FIG. 1.

As illustrated in FIG. 1, the fuel is supplied through the pipe 11 to the combustor 50 of the combustor structure 1. The oxygen separated from the air is supplied through the pipe 21 to the combustor 50. At this time, the oxygen is pressurized to a predetermined pressure by the compressor 23. The pressurized oxygen is heated by passing through the heat exchanger 42.

Further, the circulating supercritical $CO_2$ is supplied through the pipe 31 to the combustor structure 1 and the combustor 50. At this time, the supercritical $CO_2$ is heated by passing through the heat exchanger 42.

Note that as described previously, the oxygen and the supercritical $CO_2$ supplied to the combustor 50 are mixed and ejected to the combustion area in the combustor liner 51 as the oxidant.

The fuel and the oxidant guided to the combustor 50 of the combustor structure 1 are combusted in the combustor liner 51 to become the combustion gas. Note that the action in the combustor structure 1 is described later, and thus a detailed description is omitted here.

The combustion gas discharged from the combustor structure 1 is introduced to the turbine 40. The turbine 40 is moved rotationally by the combustion gas. Then, the generator 41 is driven by the rotation of the turbine 40 to generate electricity.

The combustion gas discharged from the combustor structure 1, which is mentioned here, is one containing a combustion product produced from the fuel and the oxygen and the carbon dioxide circulating through the combustor structure 1.

The combustion gas discharged from the turbine 40 is guided to the pipe 31 and cooled by passing through the heat exchanger 42. At this time, the oxygen flowing through the pipe 21 and the carbon dioxide flowing through the pipe 31 and circulating through the combustor structure 1, which are previously described, are heated by heat release from the combustion gas.

The combustion gas having passed through the heat exchanger 42 passes through the condenser 32. The combustion gas passes through the condenser 32, and thereby the water vapor contained in the combustion gas is removed therefrom. Note that the water vapor in the combustion gas condenses into water by passing through the condenser 32. The water is discharged through the pipe 36 to the outside, for example.

Here, as described previously, since the flow rates of the fuel and the oxygen are regulated so as to have the stoichiometric mixture ratio (equivalence ratio 1), most of components of the combustion gas from which the water vapor has been removed (dry combustion gas) are carbon dioxide.

The carbon dioxide is pressurized by the compressor 33 interposed in the pipe 31 to become the supercritical $CO_2$. A part of the carbon dioxide pressurized by the compressor 33 flows through the pipe 31 to be circulated through the combustor structure 1. At this time, the supercritical $CO_2$ is heated to, for example, about 700° C. by passing through the heat exchanger 42.

On one hand, the remainder of the carbon dioxide pressurized by the compressor 33 is introduced to the pipe 34 branching from the pipe 31. The carbon dioxide introduced to the pipe 34 is discharged to the outside after its flow rate is regulated by the flow rate regulating valve 35.

Next, the action in the combustor structure 1 will be described in reference to FIG. 2 and FIG. 3.

Here, as illustrated in FIG. 4, a case where the six combustors 50 are arranged at regular intervals on the predetermined circumference and the oxidant-clockwise combustors 50 and the oxidant-counterclockwise combustors 50 are arranged alternately in the circumferential direction is described as an example.

As illustrated in FIG. 2, the fuel supplied from the pipe 11 to the fuel supply part 52 is ejected from the outlet 52*a* into the combustor liner 51.

The oxygen supplied from the pipe 21 to the oxidant supply part 53 and the supercritical $CO_2$ supplied from the pipe 31 to the oxidant supply part 53 are mixed in the oxidant supply part 53 and ejected from the outlet 53*a* into the combustor liner 51. At this time, the supercritical $CO_2$ passes through the swirler 55 provided at the outlet 53*a*, and thereby the swirling flow is formed.

The mixed gas of the fuel and the oxidant in the combustor liner 51 is ignited by an ignition device (not illustrated), and the combustion starts. Note that the ignition device is provided in each of the combustors 50.

In each of the combustors 50, the swirling flow of the oxidant promotes the mixing of the fuel and the oxidant. Further, by the swirling flow of the oxidant, a recirculation zone is formed in the combustion area to form stable flames.

Then, the flow of the combustion gas in the combustor liner 51 becomes the swirling flow in the same swirling direction as the swirling direction of the swirling flow of the oxidant. That is, the swirling flows of the combustion gas in which the swirling directions are alternately opposite directions are discharged from the combustor liners 51 to the rear liner 60 when seen in the circumferential direction.

Here, a combustion reaction is completed in the combustor liner 51. Hence, most of the combustion gas discharged from an outlet of the combustor liner 51 is composed of carbon dioxide and water vapor without containing the oxygen and the fuel.

The supercritical $CO_2$ supplied around the combustor structure 1 from the pipe 31 is introduced through the introduction holes 51*c* of the combustor liner 51 into the combustor liner 51 as the cooling medium. The supercritical $CO_2$ introduced into the combustor liner 51 is discharged from the outlet of the combustor liner 51 together with the combustion gas to flow into the rear liner 60.

The combustion gas (containing the supercritical $CO_2$) discharged from the combustor liners 51 of the combustors 50 flows toward the scroll 70 in the rear liner 60.

Here, as described above, from the combustor liners 51 adjacent in the circumferential direction, the swirling flows of the combustion gas in which the swirling directions are opposite directions are discharged to the rear liner 60. In FIG. 4, the swirling directions of the swirling flows of the combustion gas in the combustor liners 51 of the combustors 50 are illustrated by solid arrows.

In the rear liner 60, the clockwise swirling flow and the counterclockwise swirling flow interfere with each other to cancel their circumferential velocity components out. This causes the flow of the combustion gas to lose most of the circumferential velocity component and become a flow mainly having the axial velocity component in the downstream direction in the rear liner 60.

Further, the supercritical $CO_2$ supplied around the combustor structure 1 from the pipe 31 is introduced through the introduction holes 62 of the rear liner 60 into the rear liner 60 as the cooling medium. The supercritical $CO_2$ introduced into the rear liner 60 flows into the scroll 70 together with the combustion gas.

The flow of the combustion gas (containing the supercritical $CO_2$) flowing into the bent flow path portion 71 of the scroll 70 is biased to about 90 degrees in the axial direction of the turbine rotor 97. Then, the combustion gas whose flow is biased flows into the annular flow path portion 72. The combustion gas flowing into the annular flow path portion 72 expands in the circumferential direction of the turbine rotor 97.

The flow of the combustion gas flowing into the scroll 70 is a flow hardly having the circumferential velocity component. Thus, a flow expanding from the bent flow path portion 71 to the annular flow path portion 72 expands uniformly in left-right directions (clockwise direction and counterclockwise direction) of the annular flow path portion 72 in, for example, the cross section illustrated in FIG. 3. This causes the flow of the combustion gas to have a nearly uniform velocity distribution in the annular flow path of the annular flow path portion 72 surrounding the turbine rotor 97.

Then, the combustion gas is ejected from the outlet 73 of the scroll 70 toward the first-stage stator blade 95. At this time, the combustion gas is ejected at a nearly uniform velocity over the circumferential direction from the annular outlet.

Note that as described above, the combustion gas flowing in the combustor structure 1 is guided to the turbine 40 to operate the turbine 40.

(Evaluation Based on Circulation in Fluid Dynamics)

Here, it will be described from the viewpoint of circulation in fluid dynamics that in the rear liner 60 of the combustor structure 1 of this embodiment, the swirling flow of the clockwise combustion gas and the swirling flow of the counterclockwise combustion gas, discharged from the combustors 50, interfere with each other, which allows the circumferential velocity components to be canceled out.

Here, in a closed curve S in a flow, a value obtained by line integrating a component of velocity Vs in a direction along this closed curve with respect to the perimeter of this closed curve is referred to as a circulation $\Gamma$ around the closed curve S.

The circulation $\Gamma$ is defined by the following equation (1).

[Equation 1]

$$\Gamma = \oint_s V_s ds \quad \text{Equation (1)}$$

Here, in the arrangement configuration of the combustor structure 1 of this embodiment illustrated in FIG. 4, there is examined a case where the combustors 50 in each of which the swirling direction of the swirling flow of the combustion gas is clockwise and the combustors 50 in each of which the swirling direction of the swirling flow of the combustion gas is counterclockwise are arranged alternately in the circumferential direction when seen from the downstream side of the combustors 50.

Here, in the following, the combustor 50 in which the swirling direction of the swirling flow of the combustion gas is clockwise is referred to as a combustion gas-clockwise combustor 50 and the combustor 50 in which the swirling direction of the swirling flow of the combustion gas is counterclockwise is referred to as a combustion gas-counterclockwise combustor 50 when seen from the downstream side of the combustors 50. Note that the combustion gas-clockwise combustor 50 means the same combustor 50 as the oxidant-clockwise combustor 50, and the combustion gas-counterclockwise combustor 50 means the same combustor 50 as the oxidant-counterclockwise combustor 50.

Figure 5:
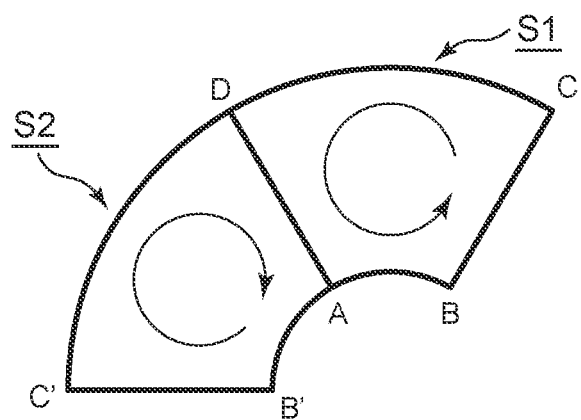
FIG. 5 is a diagram schematically illustrating swirling flows of a combustion gas in closed curves in two adjacent combustors of the combustor structure of the first embodiment.

FIG. 5 is a diagram schematically illustrating the swirling flows of the combustion gas in closed curves in the two adjacent combustors 50 of the combustor structure 1 of the first embodiment. Of the two combustors 50, one is the combustion gas-clockwise combustor 50, and the other is the combustion gas-counterclockwise combustor 50. Note that in FIG. 5, the swirling directions of the swirling flows of the combustion gas are each indicated by an arrow.

FIG. 5 provides a closed curve S1 composed of A-B-C-D and a closed curve S2 composed of B'-A-D-C'. The sum of circulations Γ of the closed curves S1, S2 is represented by the following equation (2).

[Equation 2]

$$\Gamma_{1+2}=\int_A^B V_s ds + \int_B^C V_s ds + \int_C^D V_s ds + \int_D^A V_s ds + \int_A^D V_s ds + \int_D^{C'} V_s ds + \int_{C'}^{B'} V_s ds + \int_{B'}^A V_s ds \quad \text{Equation (2)}$$

Further, in the respective line integral values, the following equation (3) to equation (6) hold from the relation in which directions of the line integrals are the same, and the swirling directions of the swirling flows are opposite.

[Equation 3]

$$\int_A^B V_s ds = -\int_B^A V_s ds \quad \text{Equation (3)}$$

[Equation 4]

$$\int_B^C V_s ds = -\int_A^D V_s ds \quad \text{Equation (4)}$$

[Equation 5]

$$\int_C^D V_s ds = -\int_C^{D'} V_s ds \quad \text{Equation (5)}$$

[Equation 6]

$$\int_D^A V_s ds = -\int_{C'}^{B'} V_s ds \quad \text{Equation (6)}$$

According to the relation of the equation (3) to the equation (6), the sum of the circulations Γ represented by the equation (2) is "0". This also causes the sum of circulations Γ to be "0" as a whole in the combustor structure 1 of this embodiment including the combustion gas-clockwise combustors 50 and the combustion gas-counterclockwise combustors 50 in the same number as each other.

Figure 13:
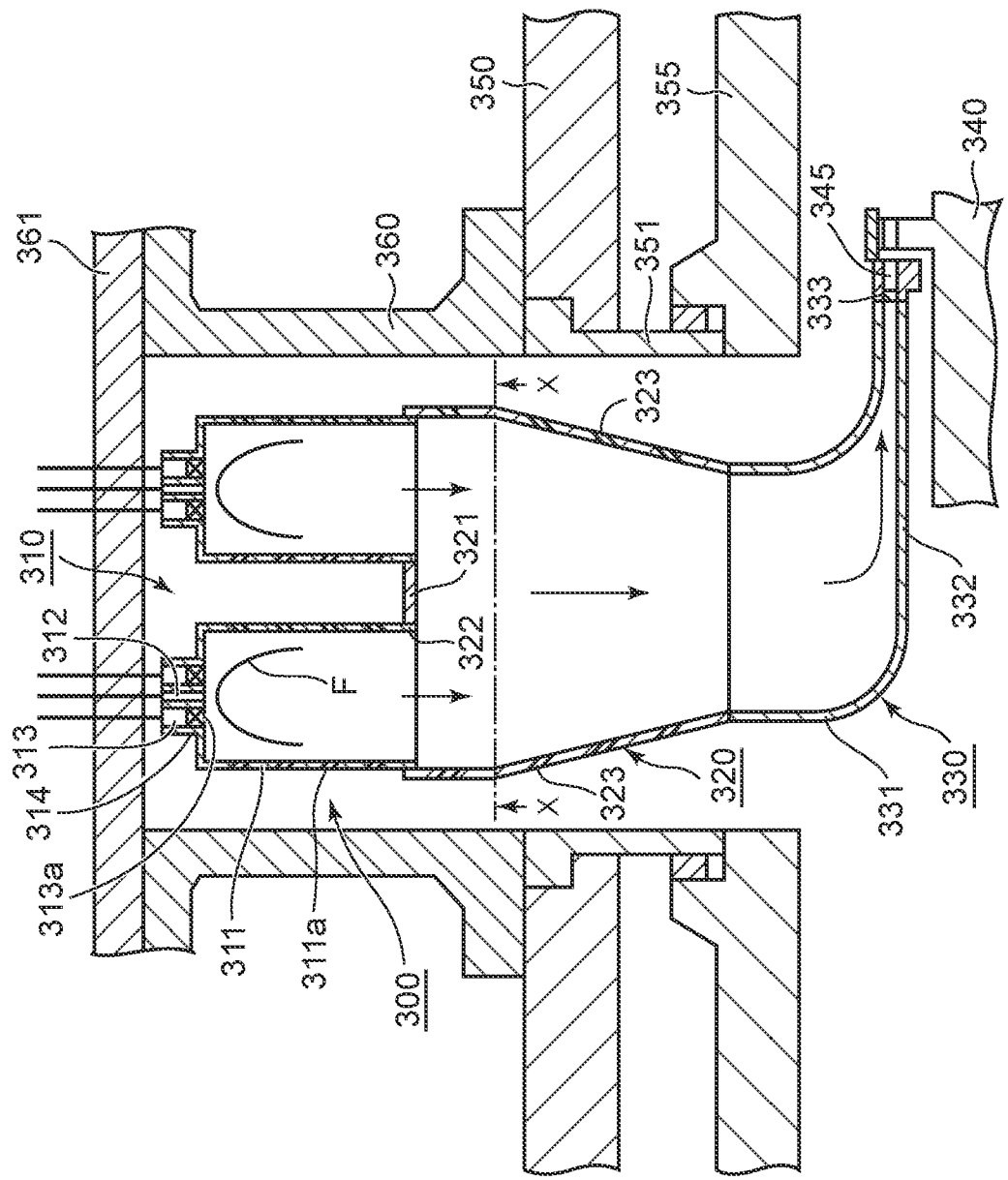
FIG. 13 is a view illustrating a longitudinal section of a vertical silo-type combustor structure in a supercritical $CO_2$ gas turbine.
Figure 14:
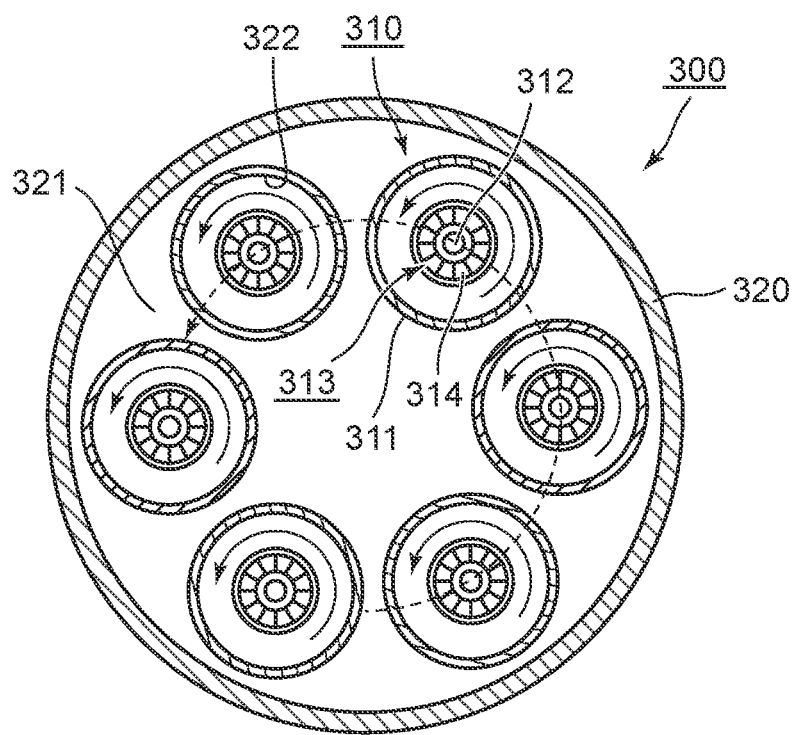
FIG. 14 is a view illustrating an X-X cross section in FIG. 13.

In contrast with this, in a combustor structure 300 as a comparative example illustrated in FIG. 13, swirling directions of swirling flows of the combustion gas in combustors 310 are the same. Thus, the equation (3) and the equation (5) do not hold. Accordingly, in the combustor structure 300, the sum of circulations Γ is not "0" as a whole. This causes a circumferential velocity component to remain in a flow of the combustion gas in a rear liner 320 and a scroll 330 in the combustor structure 300 as the comparative example illustrated in FIG. 13. That is, in the combustor structure 300, the flow of the combustion gas in the rear liner 320 and the scroll 330 becomes a swirling flow.

(Evaluation According to Computational Fluid Dynamics (CFD) Analysis)

Figure 6:
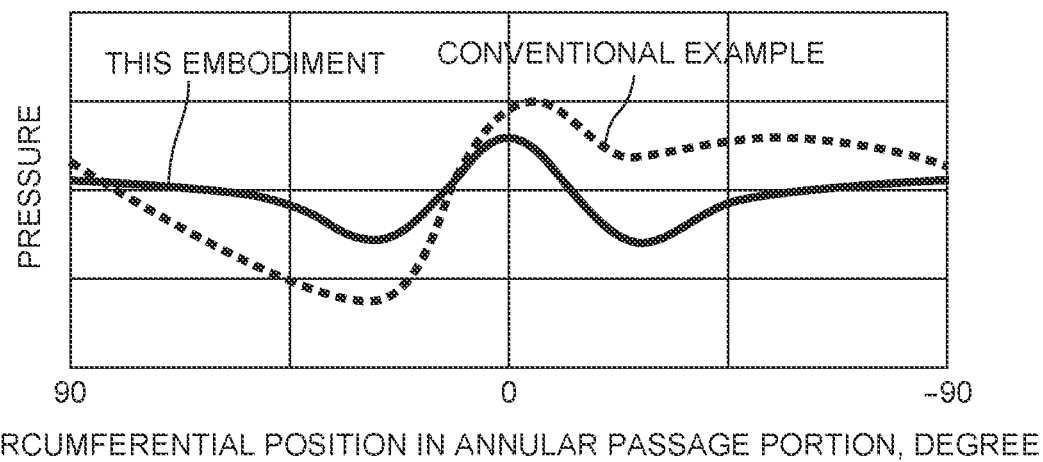
FIG. 6 is a chart illustrating pressure distributions of main flows of a combustion gas in an annular flow path portion of a scroll of the combustor structure of the first embodiment and a combustor structure as a comparative example illustrated in FIG. 13.

Here, FIG. 6 is a chart illustrating pressure distributions of main flows of the combustion gas in the annular flow path portion of the scroll in the combustor structure 1 of the first embodiment and the combustor structure 300 as the comparative example illustrated in FIG. 13.

The results of a CFD analysis illustrated in FIG. 6 are the pressure distributions in the annular flow path portion in a position corresponding to the A-A cross section in FIG. 2. Further, the result of the CFD analysis indicates the result at the center of the annular flow path portion 72 along a counterclockwise direction and a clockwise direction centered at a center axis P of the turbine rotor 97 from an upper-half top-center position Q.

Here, the upper-half top-center position Q is a central position, in the annular flow path portion 72, vertically upward from the center axis P of the turbine rotor 97 as illustrated in FIG. 3. Note that a definition of the upper-half top-center position Q is also the same as that of the annular flow path portion 332 of the combustor structure 300 in the comparative example.

Here, in the combustor structure 1 of this embodiment, the CFD analysis was performed to a specification in which the combustion gas-clockwise combustors 50 and the combustion gas-counterclockwise combustors 50 were arranged alternately in the circumferential direction in the arrangement configuration illustrated in FIG. 4. The CFD analysis was performed under rated operation conditions in the gas turbine facility 8.

Note that in the combustor structure 300 in the comparative example illustrated in FIG. 13, the swirling directions of the swirling flows of the combustion gas in the combustors 310 are the same.

Here, the vertical axis in FIG. 6 indicates a static pressure of the main flow of the combustion gas flowing through the annular flow path portion. The horizontal axis in FIG. 6 indicates a circumferential position in the annular flow path portion. On the horizontal axis in FIG. 6, the upper-half top-center position Q of the annular flow path portion in FIG. 3 is set to 0 degrees.

Further, on the horizontal axis, centered at the center axis P of the turbine rotor 97, a position at 90 degrees counterclockwise from the upper-half top-center position Q is set at 90 degrees, and a position at 90 degrees clockwise from the upper-half top-center position Q is set at −90 degrees.

As illustrated in FIG. 6, in the annular flow path portion 332 of the combustor structure 300 as the comparative example, a pressure distribution on the counterclockwise side from the upper-half top-center position Q and a pressure distribution on the clockwise side from the upper-half top-center position Q are different. That is, the pressure distribution of the combustion gas flowing from the bent flow path portion 331 into the annular flow path portion 332 becomes non-uniform in the circumferential direction.

This demonstrates that the combustor structure 300 in the comparative example in which the swirling directions of the swirling flows of the combustion gas in the combustors 310 are the same fails to obtain a uniform velocity distribution of the combustion gas in the circumferential direction in the annular flow path portion 332 of the scroll 330.

In contrast with this, in the annular flow path portion 72 of the combustor structure 1 of this embodiment, a pressure distribution on the counterclockwise side from the upper-half top-center position Q and a pressure distribution on the clockwise side from the upper-half top-center position Q indicate almost the same distribution. That is, the pressure distribution of the combustion gas flowing from the bent flow path portion 71 into the annular flow path portion 72 becomes uniform in the circumferential direction.

This demonstrates that the combustor structure 1 of this embodiment in which the combustion gas-clockwise combustors 50 and the combustion gas-counterclockwise combustors 50 are arranged alternately in the circumferential direction allows a uniform velocity distribution of the combustion gas in the circumferential direction to be obtained in the annular flow path portion 72 of the scroll 70.

As described above, according to the combustor structure 1 of the first embodiment, by including the combustion gas-clockwise combustors 50 and the combustion gas-counterclockwise combustors 50 as the plurality of combustors 50, in the rear liner 60, the clockwise swirling flow and the counterclockwise swirling flow interfere with each other, which allows the circumferential velocity components to be canceled out.

Thus, the uniform velocity distribution of the combustion gas in the circumferential direction can be obtained in the annular flow path portion 72 of the scroll 70. This allows the ejection of the combustion gas to the first-stage stator blade 95 at a nearly uniform velocity over the circumferential direction from the outlet 73 of the scroll (annular flow path portion 72).

Further, in the combustor 50 in the combustor structure 1 of the first embodiment, in one space in the one combustor liner 51, ejecting the swirling flow of the oxidant from the oxidant supply part 53 enables the promotion of mixing of the fuel and the oxidant and the stabilization of flames.

Second Embodiment

Figure 7:
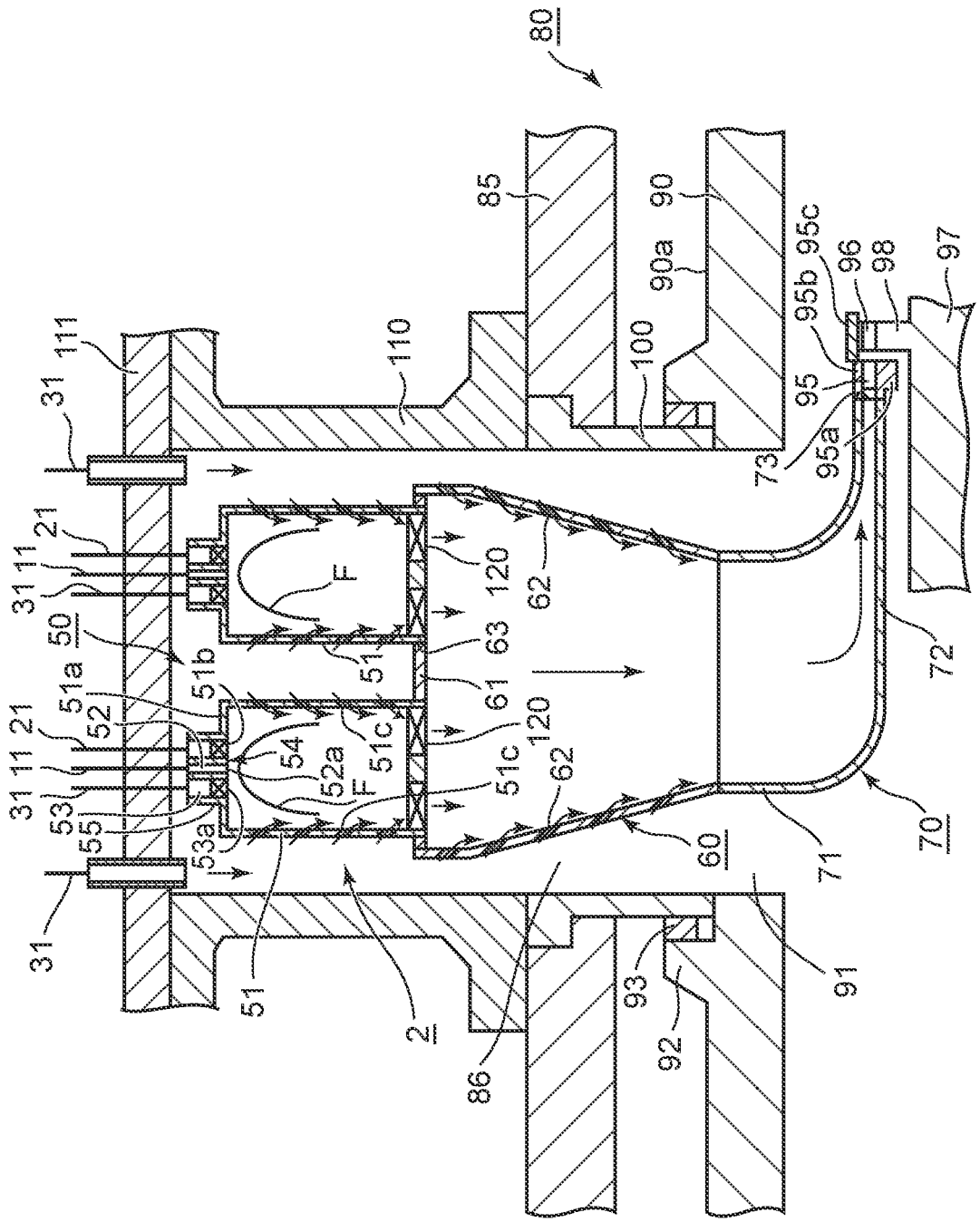
FIG. 7 is a view illustrating a longitudinal section of a combustor structure of a second embodiment.

FIG. 7 is a view illustrating a longitudinal section of a combustor structure 2 of a second embodiment. Note that in the following embodiment, the same components as those of the combustor structure 1 of the first embodiment are denoted by the same reference signs, and redundant descriptions are omitted or simplified. Further, in the following embodiment, a system diagram of a gas turbine facility is the same as the system diagram of the gas turbine facility described in the first embodiment.

The combustor structure 2 of the second embodiment has essentially the same configuration as that of the combustor structure 1 of the first embodiment except to include an opposite swirl imparting part 120. Thus, here, a configuration of the opposite swirl imparting part 120 will be mainly described.

As illustrated in FIG. 7, each of combustors 50 of the combustor structure 2 is provided with the opposite swirl imparting part 120 at an outlet of a combustor liner 51. The opposite swirl imparting part 120 is disposed to block the outlet of the combustor liner 51, for example. The opposite swirl imparting part 120 is constituted by an annular swirler. Note that a structure of the swirler is as described in the first embodiment.

The opposite swirl imparting part 120 imparts a swirl in the opposite direction to a swirling direction of a swirling flow of an oxidant to a flow of a combustion gas passing through the opposite swirl imparting part 120. That is, the swirling direction imparted to the flow of the combustion gas by the opposite swirl imparting part 120 is the opposite direction to a swirling direction of a swirling flow of the combustion gas on an upstream side from the opposite swirl imparting part 120.

Note that the swirling direction of the swirling flow of the oxidant in each of the combustors 50 is not particularly limited. That is, the swirling direction of the swirling flow of the oxidant in each of the combustors 50 may be clockwise, or may be counterclockwise.

The swirler constituting the opposite swirl imparting part 120 is designed to eliminate a circumferential velocity component in the swirling flow of the combustion gas flowing into the opposite swirl imparting part 120.

In the combustor 50 including the above-described opposite swirl imparting part 120, the combustion gas passes through the opposite swirl imparting part 120, and thereby the swirling flow of the combustion gas is attenuated. This causes a flow of the combustion gas flowing into a rear liner 60 to become a flow hardly having the circumferential velocity component.

Then, a flow expanding from a bent flow path portion 71 to an annular flow path portion 72 expands uniformly in left-right directions (clockwise direction and counterclockwise direction) of the annular flow path portion 72 in the cross section illustrated in FIG. 3, for example. This causes the flow of the combustion gas to have a nearly uniform velocity distribution in an annular flow path of the annular flow path portion 72 surrounding a turbine rotor 97.

As described above, according to the combustor structure 2 of the second embodiment, by providing the opposite swirl imparting part 120 at the outlet of the combustor liner 51 of each of the combustors 50, the flow of the combustion gas hardly having the circumferential velocity component can be obtained when the combustion gas is discharged from each of the combustors 50.

This allows the ejection of the combustion gas to a first-stage stator blade 95 at a nearly uniform velocity over the circumferential direction from an outlet 73 of a scroll 70 (annular flow path portion 72).

Note that in the second embodiment, although a concrete CFD analysis result is not indicated, by including the opposite swirl imparting part 120, a result similar to the result in the combustor structure 1 of the first embodiment can be obtained. That is, in the annular flow path portion 72 of the combustor structure 2 of the second embodiment, a pressure distribution on the counterclockwise side from an upper-half top-center position Q and a pressure distribution on the clockwise side from the upper-half top-center position Q indicate almost the same distribution.

Third Embodiment

Figure 8:
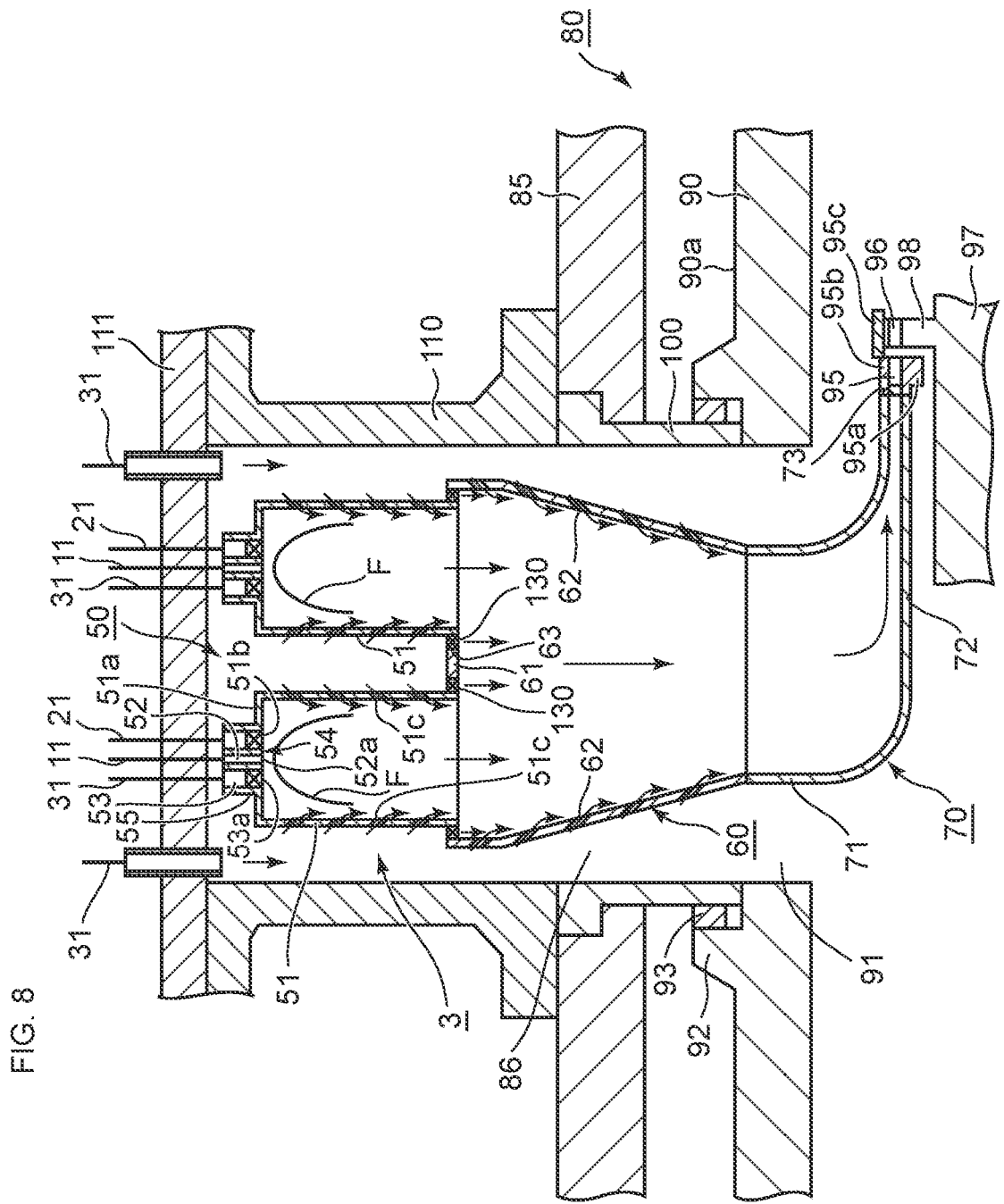
FIG. 8 is a view illustrating a longitudinal section of a combustor structure of a third embodiment.

FIG. 8 is a view illustrating a longitudinal section of a combustor structure 3 of a third embodiment.

The combustor structure 3 of the third embodiment has essentially the same configuration as that of the combustor structure 1 of the first embodiment except to include a $CO_2$ swirling flow introducing part 130. Thus, here, a configuration of the $CO_2$ swirling flow introducing part 130 will be mainly described.

As illustrated in FIG. 8, each of combustors 50 of the combustor structure 3 is provided with the $CO_2$ swirling flow introducing part 130 in an annular shape on an outer periphery of an outlet of a combustor liner 51.

The $CO_2$ swirling flow introducing part 130 imparts a swirl to supercritical $CO_2$ which is a cooling medium supplied from a pipe 31 into a combustor casing 110 and introduces a swirling flow of the supercritical $CO_2$ into a rear liner 60. The $CO_2$ swirling flow introducing part 130 is constituted by an annular swirler.

A swirling direction of the swirling flow of the supercritical $CO_2$ introduced from the $CO_2$ swirling flow introducing part 130 into the rear liner 60 is the opposite direction to a swirling direction of a swirling flow of a combustion gas discharged from the combustor liner 51 provided with the $CO_2$ swirling flow introducing part 130.

Note that a swirling direction of a swirling flow of an oxidant in each of the combustors 50 is not particularly limited. That is, the swirling direction of the swirling flow of the oxidant in each of the combustors 50 may be clockwise, or may be counterclockwise.

A flow rate of the supercritical $CO_2$ and a ratio of a circumferential velocity component to an axial velocity component in the swirling flow thereof, introduced from each of the $CO_2$ swirling flow introducing parts 130 into the rear liner 60, are set to a degree that a circumferential velocity component of the swirling flow of the flow of the combustion gas discharged from the combustor liner 51 is canceled out.

In each of the above-described combustors 50, the supercritical $CO_2$ swirling in the opposite direction to the swirling direction of the swirling flow of the combustion gas is ejected from the $CO_2$ swirling flow introducing part 130 so as to surround an outer periphery of the flow of the combustion gas discharged from the combustor liner 51.

Thus, the swirling flow of the combustion gas is attenuated by the swirling flow of the swirling supercritical $CO_2$. Then, the flow of the combustion gas becomes a flow hardly having the circumferential velocity component while flowing in the rear liner 60.

Then, a flow expanding from a bent flow path portion 71 to an annular flow path portion 72 expands uniformly in left-right directions (clockwise direction and counterclockwise direction) of the annular flow path portion 72 in the cross section illustrated in FIG. 3, for example. This causes the flow of the combustion gas to have a nearly uniform velocity distribution in an annular flow path of the annular flow path portion 72 surrounding a turbine rotor 97.

As described above, according to the combustor structure 3 of the third embodiment, by providing the $CO_2$ swirling flow introducing part 130 in the annular shape on the outer periphery of the outlet of the combustor liner 51 in each of the combustors 50, the swirling flow of the combustion gas can be attenuated by the flow of the supercritical $CO_2$.

This allows the ejection of the combustion gas to a first-stage stator blade 95 at a nearly uniform velocity over the circumferential direction from an outlet 73 of a scroll 70 (annular flow path portion 72).

Fourth Embodiment

Figure 9:
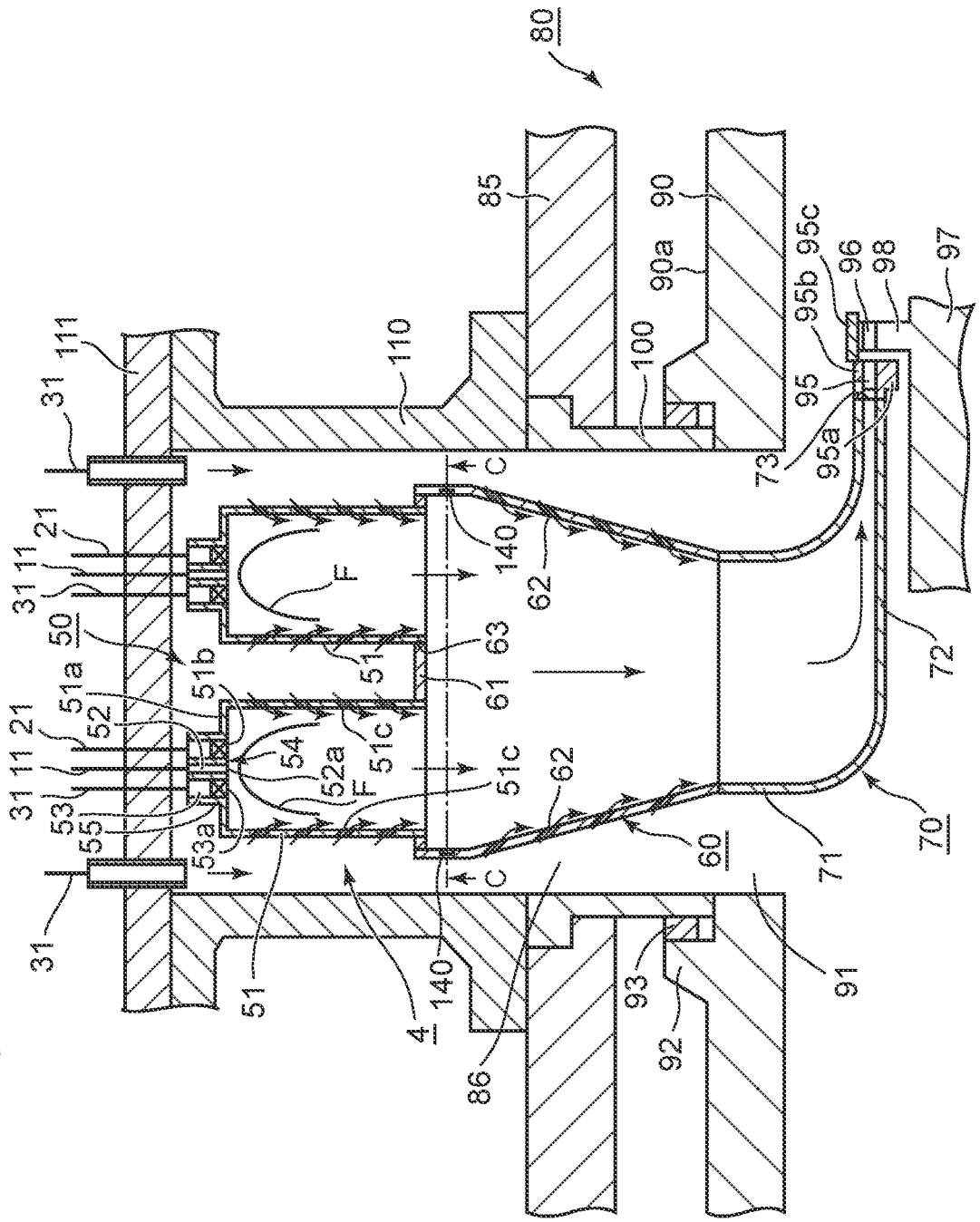
FIG. 9 is a view illustrating a longitudinal section of a combustor structure of a fourth embodiment.
Figure 10:
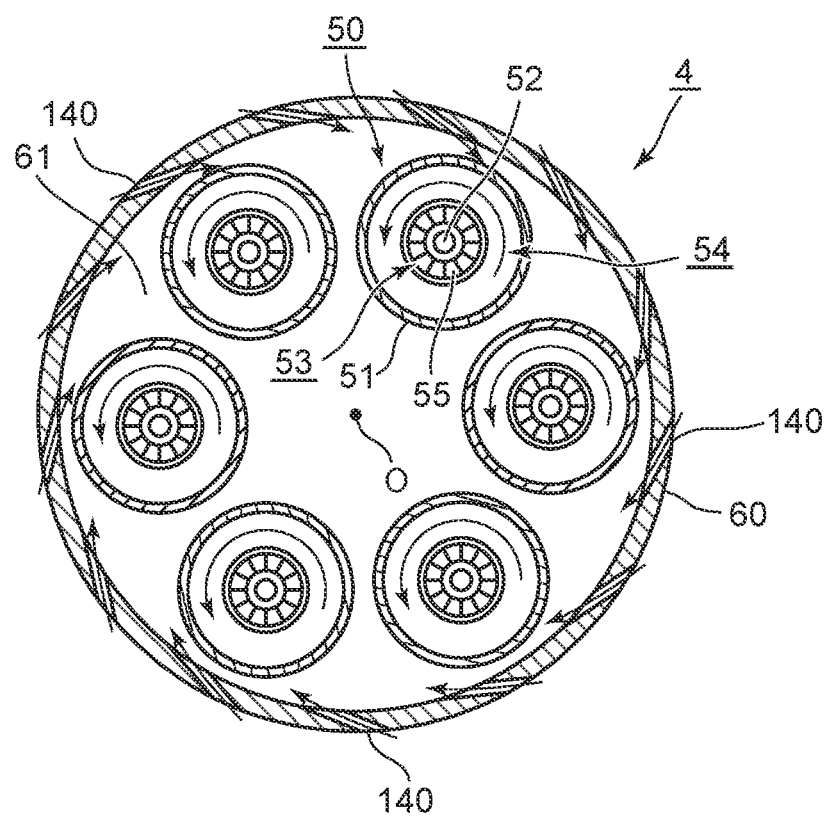
FIG. 10 is a view illustrating a C-C cross section in FIG. 9.

FIG. 9 is a view illustrating a longitudinal section of a combustor structure 4 of a fourth embodiment. FIG. 10 is a view illustrating a C-C cross section in FIG. 9.

The combustor structure 4 of the fourth embodiment has essentially the same configuration as that of the combustor structure 1 of the first embodiment except to include a $CO_2$ swirling flow introducing part 140. Thus, here, a configuration of the $CO_2$ swirling flow introducing part 140 will be mainly described.

As illustrated in FIG. 9 and FIG. 10, the combustor structure 4 is provided with the $CO_2$ swirling flow introducing parts 140 formed in a rear liner 60.

As illustrated in FIG. 10, the $CO_2$ swirling flow introducing parts 140 are each formed in a circumferential direction of a sidewall of the rear liner 60 in a predetermined position in a direction of a center axis of the rear liner 60. The $CO_2$ swirling flow introducing parts 140 are constituted by a plurality of through holes penetrating the rear liner 60 in a direction inclined at a predetermined angle to a direction (radial direction) toward a center axis O of the rear liner 60.

In a cross section in FIG. 10, the through hole penetrates the rear liner 60 in a tangential direction of an inner peripheral surface of the rear liner 60, for example.

The through holes which are the $CO_2$ swirling flow introducing parts 140 form a swirling flow of supercritical $CO_2$ in the rear liner 60 by ejecting the supercritical $CO_2$ which is a cooling medium supplied from a pipe 31 into a combustor casing 110 therethrough.

Here, swirling directions of swirling flows of an oxidant in combustors 50 are set in the same direction. That is, swirling directions of swirling flows of a combustion gas discharged from combustor liners 51 are also the same direction.

Here, the plurality of through holes which are the $CO_2$ swirling flow introducing parts 140 are formed to form the swirling flow of supercritical $CO_2$ in the opposite direction to the swirling direction of the swirling flows of the combustion gas discharged from the combustor liners 51. In FIG. 10, the swirling directions of the swirling flows of the combustion gas in the combustor liners 51 of the combustors 50 and ejection directions of the supercritical $CO_2$ ejected from the through holes are indicated by arrows.

Here, the $CO_2$ swirling flow introducing parts 140 are preferably formed on an inlet side of the rear liner 60, that is, in an upstream portion of the rear liner 60. Further, the $CO_2$ swirling flow introducing parts 140 may be formed in a plurality of predetermined positions in the direction of the center axis of the rear liner 60. That is, the $CO_2$ swirling flow introducing parts 140 may be formed in a plurality of tiers in the direction of the center axis of the rear liner 60.

A flow rate of the supercritical $CO_2$ introduced from the $CO_2$ swirling flow introducing part 140 into the rear liner 60 and an inclination angle of the through hole which is the $CO_2$ swirling flow introducing part 140 to the direction toward the center axis O are set to a degree that a circumferential velocity component of the swirling flow of the combustion gas formed in the rear liner 60 is canceled out.

In the above-described combustor structure 4, the swirling flow swirling in one direction is formed in the rear liner 60 by the combustion gas discharged from the combustor liners 51. On the other hand, by the supercritical $CO_2$ ejected from the through holes which are the $CO_2$ swirling flow introducing parts 140, the swirling flow of the supercritical $CO_2$ in the opposite direction to the swirling direction of the flow of the combustion gas is formed in the rear liner 60.

Then, the swirling flow of the combustion gas is attenuated by the swirling flow of the supercritical $CO_2$. This causes the flow of the combustion gas to become a flow hardly having the circumferential velocity component while flowing in the rear liner 60.

Then, a flow expanding from a bent flow path portion 71 to an annular flow path portion 72 expands uniformly in left-right directions (clockwise direction and counterclockwise direction) of the annular flow path portion 72 in the cross section illustrated in FIG. 3, for example. This causes the flow of the combustion gas to have a nearly uniform velocity distribution in an annular flow path of the annular flow path portion 72 surrounding a turbine rotor 97.

As described above, according to the combustor structure 4 of the fourth embodiment, by providing the $CO_2$ swirling flow introducing parts 140 in the rear liner 60, the swirling flow of the combustion gas can be attenuated by the swirling flow of the supercritical $CO_2$. This allows the ejection of the combustion gas to a first-stage stator blade 95 at a nearly uniform velocity over the circumferential direction from an outlet 73 of a scroll 70 (annular flow path portion 72).

Here, the configuration of the $CO_2$ swirling flow introducing part 140 in the combustor structure 4 of the fourth embodiment is not limited to the above-described configuration.

Figure 11:
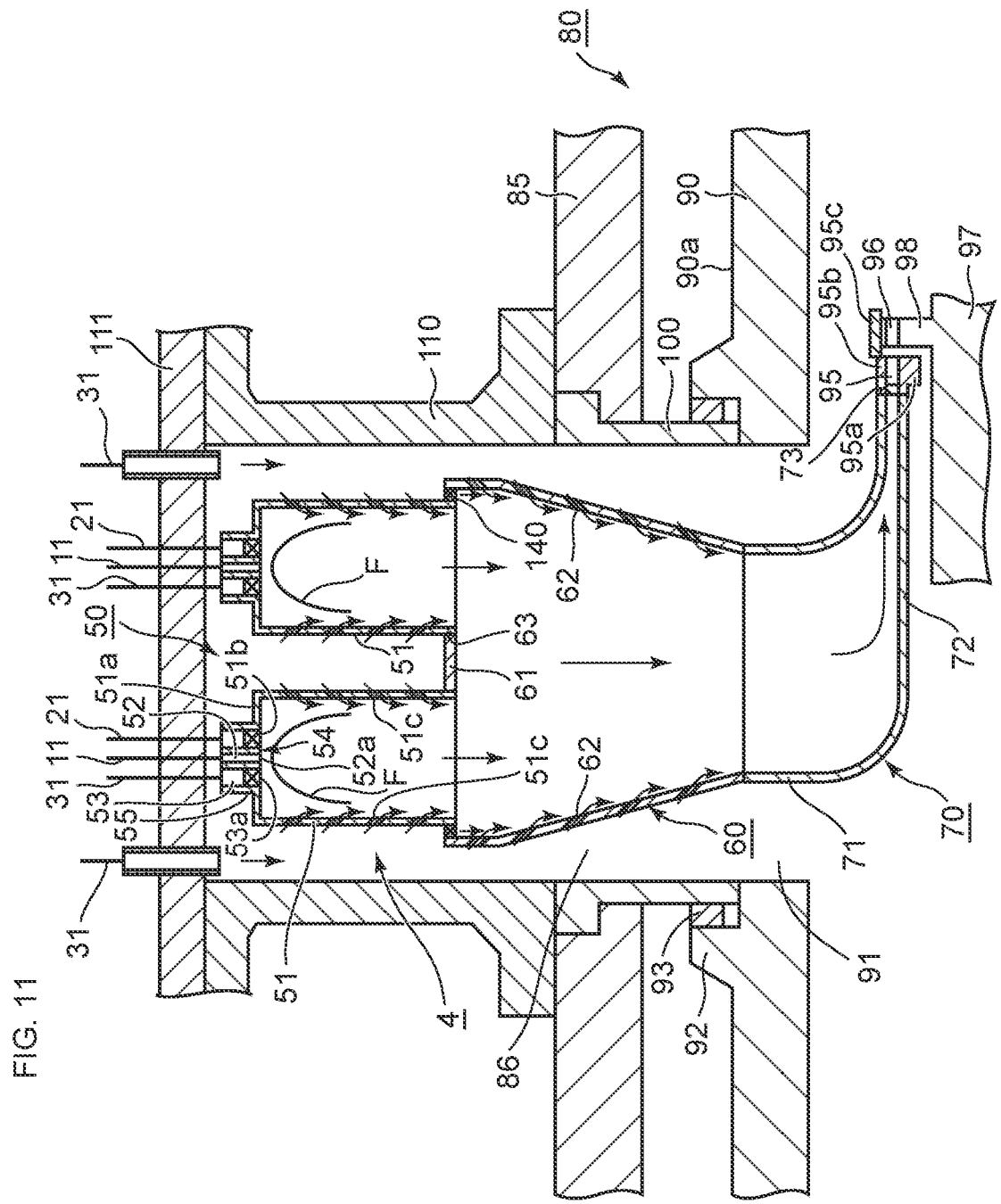
FIG. 11 is a view illustrating a longitudinal section of the combustor structure having another configuration of the fourth embodiment.

FIG. 11 is a view illustrating a longitudinal section of the combustor structure 4 having another configuration of the fourth embodiment.

As illustrated in FIG. 11, the $CO_2$ swirling flow introducing part 140 may be constituted by an annular swirler provided in an upstream end wall 61 provided at an upstream end of the rear liner 60. The annular swirler is formed over the circumferential direction at an outer edge of the upstream end wall 61.

The swirler which is the $CO_2$ swirling flow introducing part 140 forms a swirling flow of the supercritical $CO_2$ in the rear liner 60 by ejecting the supercritical $CO_2$ supplied from the pipe 31 into the combustor casing 110.

Here, as previously described, the swirling directions of the flows of the combustion gas discharged from the combustor liners 51 are also the same direction.

The swirling direction of the swirling flow of the supercritical $CO_2$ ejected from the $CO_2$ swirling flow introducing part 140 is the opposite direction to the swirling direction of the flows of the combustion gas discharged from the combustor liners 51.

A flow rate of the supercritical $CO_2$ introduced from the $CO_2$ swirling flow introducing part 140 into the rear liner 60 and a ratio of a circumferential velocity component to an axial velocity component thereof in the swirler constituting the $CO_2$ swirling flow introducing part 140 are set to a degree that a circumferential velocity component of the swirling flow of the combustion gas formed in the rear liner 60 is canceled out.

Also in the case of including the $CO_2$ swirling flow introducing part 140 in the above-described other configuration, the operation and effect similar to the case of including the $CO_2$ swirling flow introducing parts 140 illustrated in FIG. 10 and FIG. 9 can be obtained.

Fifth Embodiment

Figure 12:
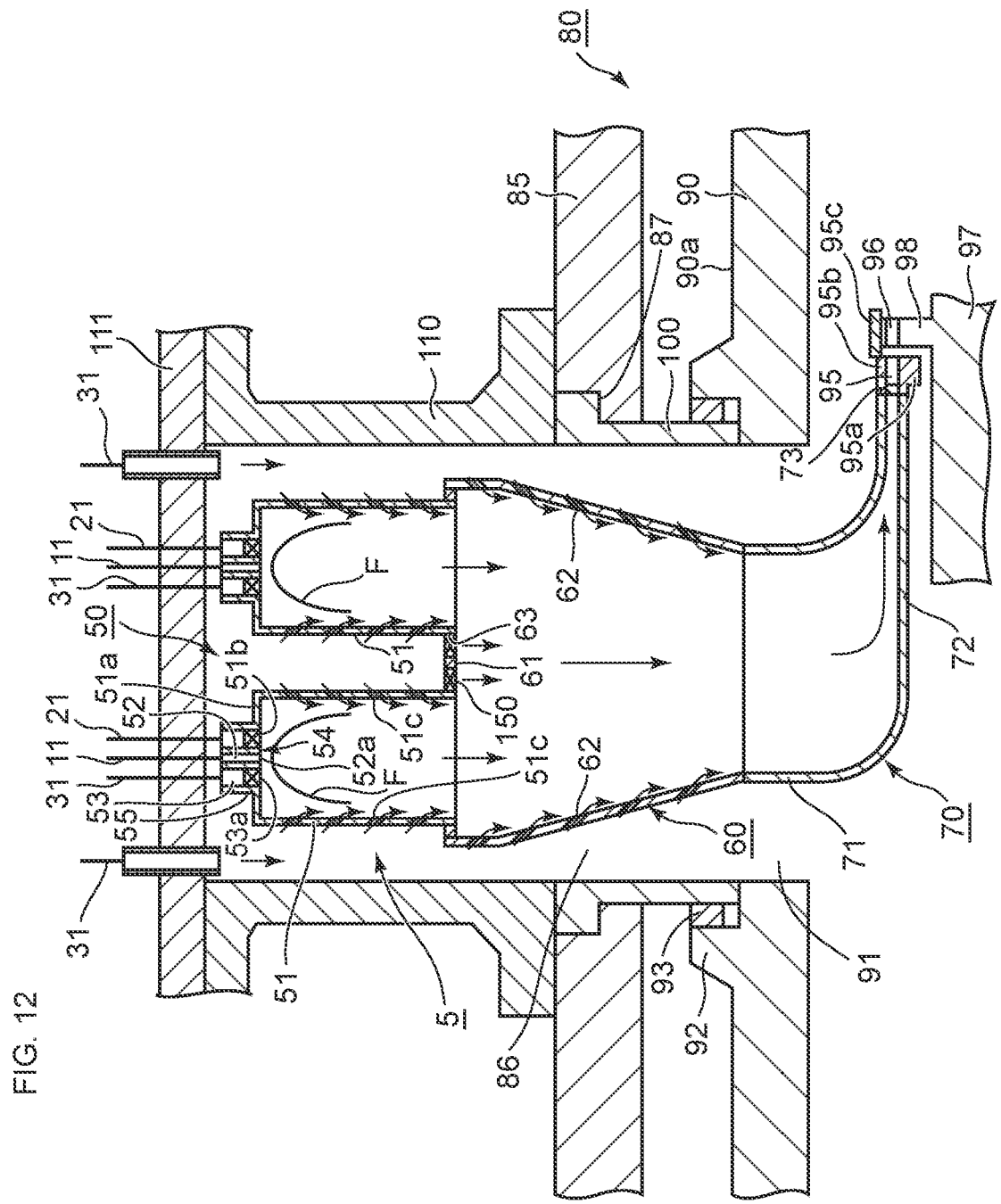
FIG. 12 is a view illustrating a longitudinal section of a combustor structure of a fifth embodiment.

FIG. 12 is a view illustrating a longitudinal section of a combustor structure 5 of a fifth embodiment.

The combustor structure 5 of the fifth embodiment has essentially the same configuration as that of the combustor structure 1 of the first embodiment except to include a $CO_2$ swirling flow introducing part 150. Thus, here, a configuration of the $CO_2$ swirling flow introducing part 150 will be mainly described.

As illustrated in FIG. 12, in the combustor structure 5, the $CO_2$ swirling flow introducing part 150 is provided in an upstream end wall 61 provided at an upstream end of a rear liner 60. The $CO_2$ swirling flow introducing part 150 is constituted by an annular swirler provided closer to the center than through openings 63 provided on a predetermined circumference to correspond to combustor liners 51.

The swirler which is the $CO_2$ swirling flow introducing part 150 forms a swirling flow of supercritical $CO_2$ in the rear liner 60 by ejecting the supercritical $CO_2$ which is a cooling medium supplied from a pipe 31 into a combustor casing 110.

Here, swirling directions of swirling flows of an oxidant in combustors 50 are set in the same direction. That is, swirling directions of swirling flows of a combustion gas discharged from the combustor liners 51 are also the same direction.

A swirling direction of the swirling flow of the supercritical $CO_2$ ejected from the $CO_2$ swirling flow introducing part 150 is the opposite direction to the swirling direction of the flows of the combustion gas discharged from the combustor liners 51.

A flow rate of the supercritical $CO_2$ introduced from the $CO_2$ swirling flow introducing part 150 into the rear liner 60 and a ratio of a circumferential velocity component to an axial velocity component thereof in the swirler constituting the $CO_2$ swirling flow introducing part 150 are set to a degree that a circumferential velocity component of the swirling flow of the combustion gas formed in the rear liner 60 is canceled out.

In the above-described combustor structure 5, the swirling flow swirling in one direction is formed in the rear liner 60 by the combustion gas discharged from the combustor liners 51. On the other hand, by the supercritical $CO_2$ ejected from the swirler which is the $CO_2$ swirling flow introducing part 150, the swirling flow of the supercritical $CO_2$ in the opposite direction to the swirling direction of the flow of the combustion gas is formed in the rear liner 60. This swirling flow of the supercritical $CO_2$ is formed at the swirl center portion of the swirling flow of the combustion gas.

Then, the swirling flow of the combustion gas is attenuated by the swirling flow of the supercritical $CO_2$. This causes the flow of the combustion gas to become a flow hardly having the circumferential velocity component while flowing in the rear liner 60.

Then, a flow expanding from a bent flow path portion 71 to an annular flow path portion 72 expands uniformly in left-right directions (clockwise direction and counterclockwise direction) of the annular flow path portion 72 in the cross section illustrated in FIG. 3, for example. This causes the flow of the combustion gas to have a nearly uniform velocity distribution in an annular flow path of the annular flow path portion 72 surrounding a turbine rotor 97.

As described above, according to the combustor structure 5 of the fifth embodiment, by providing the $CO_2$ swirling flow introducing part 150 in the rear liner 60, the swirling flow of the combustion gas can be attenuated by the swirling flow of the supercritical $CO_2$.

This allows the ejection of the combustion gas to a first-stage stator blade 95 at a nearly uniform velocity over the circumferential direction from an outlet 73 of a scroll 70 (Annular Flow Path Portion 72).

Note that in the above-described third embodiment to fifth embodiment, although concrete CFD analysis results are not indicated, by including the $CO_2$ swirling flow introducing parts 130, 140, 150, results similar to the result in the combustor structure 1 of the first embodiment can be obtained.

That is, in the annular flow path portion 72 of each of the combustor structures 3, 4, 5 in the third embodiment to the fifth embodiment, a pressure distribution on the counterclockwise side from an upper-half top-center position Q and a pressure distribution on the clockwise side from the upper-half top-center position Q indicate almost the same distribution.

Other Embodiment

When the swirling directions of the swirling flows of the combustion gas discharged from the combustor liners 51 are the same in the combustor structure 3 of the third embodiment (when the swirling directions of the swirling flows of the oxidant in the combustors 50 are the same), the combustor structure 3 may further include the $CO_2$ swirling flow introducing part 140 in the combustor structure 4 of the fourth embodiment or the $CO_2$ swirling flow introducing part 150 in the combustor structure 5 of the fifth embodiment.

Further, the combustor structure 4 of the fourth embodiment may further include the $CO_2$ swirling flow introducing part 150 in the combustor structure 5 of the fifth embodiment.

Further, in the embodiments described above, the examples in which the combustor structures 1, 2, 3, 4, 5 are each provided on the upper half side are indicated, and the configurations are not restrictive.

The combustor structures 1, 2, 3, 4, 5 each may be provided on a lower half side. In this case, the combustor structures 1, 2, 3, 4, 5 are each disposed to penetrate the outer casing 85 and the inner casing 90 from, for example, a vertically lower side.

Moreover, the combustor structures 1, 2, 3, 4, 5 each may be provided on both the upper half side and the lower half side.

According to the above-described embodiments, even when the swirling flow of the combustion gas is formed in the combustor, it becomes possible to eject the combustion gas to the first-stage stator blade at a nearly uniform velocity over the circumferential direction from the scroll outlet.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gas turbine combustor structure disposed to penetrate a casing of a gas turbine from a direction perpendicular to an axial direction of a turbine rotor of the gas turbine, the gas turbine combustor structure comprising:
a plurality of combustors;
a rear liner which is constituted by a cylinder body provided in a direction perpendicular to the axial direction of the turbine rotor on a downstream side of the plurality of combustors, and gathers a combustion gas discharged from the plurality of combustors and guides the combustion gas to a downstream side; and
a scroll which is connected to a downstream end of the rear liner, and guides the combustion gas discharged from the rear liner in the axial direction of the turbine rotor and guides the combustion gas in a circumferential direction of the turbine rotor, wherein:
each combustor of the plurality of combustors comprises:
a combustor liner in a cylindrical shape, which combusts fuel and an oxidant;
a fuel supply part which is provided at an upstream end of the combustor liner, and supplies the fuel into the combustor liner; and
an oxidant supply part which is provided in an annular shape around the fuel supply part, and supplies a swirling flow of the oxidant into the combustor liner; and
the plurality of combustors comprise:

the combustor in which a swirling direction of the swirling flow of the oxidant is clockwise when seen from a downstream side of the oxidant supply part; and
the combustor in which a swirling direction of the swirling flow of the oxidant is counterclockwise when seen from the downstream side of the oxidant supply part.

2. The gas turbine combustor structure according to claim 1, wherein:
the plurality of combustors are constituted by even numbers of the combustors;
the plurality of combustors are arranged at regular intervals on a predetermined circumference when seen from a downstream side of the combustor liner; and
swirling directions of the swirling flows of the oxidant are opposite directions to each other in the combustors adjacent in a circumferential direction.

3. A gas turbine combustor structure disposed to penetrate a casing of a gas turbine from a direction perpendicular to an axial direction of a turbine rotor of the gas turbine, the gas turbine combustor structure comprising:
a plurality of combustors;
a rear liner which is constituted by a cylinder body provided in a direction perpendicular to the axial direction of the turbine rotor on a downstream side of the plurality of combustors, and gathers a combustion gas discharged from the plurality of combustors and guides the combustion gas to a downstream side; and
a scroll which is connected to a downstream end of the rear liner, and guides the combustion gas discharged from the rear liner in the axial direction of the turbine rotor and guides the combustion gas in a circumferential direction of the turbine rotor, wherein
each combustor of the plurality of combustors comprises:
a combustor liner in a cylindrical shape, which combusts fuel and an oxidant;
a fuel supply part which is provided at an upstream end of the combustor liner, and supplies the fuel into the combustor liner;
an oxidant supply part which is provided in an annular shape around the fuel supply part, and supplies a swirling flow of the oxidant into the combustor liner; and
an opposite swirl imparting part which is disposed at an outlet of the combustor liner, and imparts a swirl in an opposite direction to a swirling direction of the swirling flow of the oxidant.

4. A gas turbine combustor structure disposed to penetrate a casing of a gas turbine from a direction perpendicular to an axial direction of a turbine rotor of the gas turbine, the gas turbine combustor structure comprising:
a combustor casing;
a plurality of combustors arranged in the combustor casing;
a rear liner which is constituted by a cylinder body provided in a direction perpendicular to the axial direction of the turbine rotor on a downstream side of the plurality of combustors, and gathers a combustion gas discharged from the plurality of combustors and guides the combustion gas to a downstream side;
a scroll which is connected to a downstream end of the rear liner, and guides the combustion gas discharged from the rear liner in the axial direction of the turbine rotor and guides the combustion gas in a circumferential direction of the turbine rotor;
a cooling medium supply part which supplies a cooling medium into the combustor casing; and a swirling flow introducing part which imparts a swirl to the cooling medium supplied into the combustor casing and introduces the cooling medium into the rear liner wherein:

each combustor of the plurality of combustors comprises:

a combustor liner in a cylindrical shape, which combusts fuel and an oxidant;

a fuel supply part which is provided at an upstream end of the combustor liner, and supplies the fuel into the combustor liner; and an oxidant supply part which is provided in an annular shape around the fuel supply part, and supplies a swirling flow of the oxidant into the combustor liner, wherein a swirling direction of a swirling flow caused by the cooling medium introduced from the swirling flow introducing part is an opposite direction to a swirling direction of the swirling flow of the oxidant.

5. The gas turbine combustor structure according to claim 4, wherein the swirling flow introducing part is constituted by an annular swirler provided on an outer periphery of an outlet of the combustor liner in each of the combustors.

6. The gas turbine combustor structure according to claim 4, wherein:

swirling directions of the swirling flows of the oxidant in the combustors are a same direction; and the swirling flow introducing parts are each formed in a circumferential direction of the rear liner in a predetermined position in a direction of a center axis of the rear liner, the swirling flow introducing parts are constituted by a plurality of through holes penetrating the rear liner in a direction inclined to a direction toward the center axis of the rear liner.

7. The gas turbine combustor structure according to claim 4, comprising an end wall in a flat-plate shape, which has a through opening fitted in a downstream end portion of the combustor liner of each of the combustors, and seals an upstream end of the rear liner, wherein:

swirling directions of the swirling flows of the oxidant in the combustors are a same direction; and the swirling flow introducing part is constituted by an annular swirler provided at an outer edge of the end wall.

8. The gas turbine combustor structure according to claim 4, comprising an end wall in a flat-plate shape, which has a through opening fitted in a downstream end portion of the combustor liner of each of the combustors, and seals an upstream end of the rear liner, wherein:

the plurality of combustors are arranged at regular intervals on a predetermined circumference when seen from a downstream side of the combustor liner;

swirling directions of the swirling flows of the oxidant in the combustors are a same direction; and the swirling flow introducing part is constituted by an annular swirler provided closer to a center than the through opening provided on a predetermined circumference to correspond to the combustor liner in the end wall.

* * * * *